United States Patent [19]

Kaufman et al.

[11] Patent Number: 4,985,856

[45] Date of Patent: Jan. 15, 1991

[54] METHOD AND APPARATUS FOR STORING, ACCESSING, AND PROCESSING VOXEL-BASED DATA

[75] Inventors: Arie E. Kaufman; Reuven Bakalash, both of Plainview, N.Y.

[73] Assignee: The Research Foundation of State University of New York, Albany, N.Y.

[21] Appl. No.: 269,567

[22] Filed: Nov. 10, 1988

[51] Int. Cl.$^5$ ............................................. G06F 15/72
[52] U.S. Cl. ................................................... 364/522
[58] Field of Search ........................ 364/522; 340/729; 378/901

[56] References Cited

PUBLICATIONS

"The Multiple-Write Bus Technique" by Renate Gemballa and Rolf Lindner in *I.E.E.E. Computer Graphics and Applications*, Sep. 1982, at pp. 33–41.

"Towards a 3-D Graphics Workstation", *Advances in Graphics Hardware I*, Arie Kaufman, W. Strasser (Ed), Springer-Verlag, pp. 17–26, 1987.

"Voxel-Based Architectures for Three-Dimensional Graphics", *Proc. IFIP '86, 10th World Computer Congress*, Arie Kaufman, Dublin, Ireland, pp. 361–366, 9/86.

"CUBE—An Architecture Based on a 3-D Voxel Map," *Theoretical Foundations of Computer Graphics and CAD*, Arie Kaufman and R. Bakalash, R. A. Earnshaw, (Ed.) Springer-Verlag, pp. 689–701, 1988.

*Primary Examiner*—Gary V. Harkcom
*Assistant Examiner*—Mark K. Zimmerman
*Attorney, Agent, or Firm*—Hoffmann & Baron

[57] ABSTRACT

A method and apparatus for storing to and accessing from a memory device, one or more voxels of a beam disposed along one or more of a plurality of storage/retrieval directions of a 3-D matrix array in 3-D discrete voxel space. Voxels are stored into memory space by mapping the voxels along one of the plurality of storage/retrieval directions, into a plurality of independently addressable memory modules in memory storage space. Each memory module is indexed by a memory module index and has internal memory cell addresses. The mapping is carried out in accordance with a linear skewing function which expressed in terms of x, y, and z coordinate directions and integer n. The voxels can be retrieved along one or more of a plurality of storage/retrieval directions by de-mapping one or more of the voxels from the memory storage space into 3-D voxel space using spacial parameters and integer n. The demapping operations of the present method are also used in order to determine the voxel depth measures of voxels along one of the storage/retrieval directions.

19 Claims, 15 Drawing Sheets

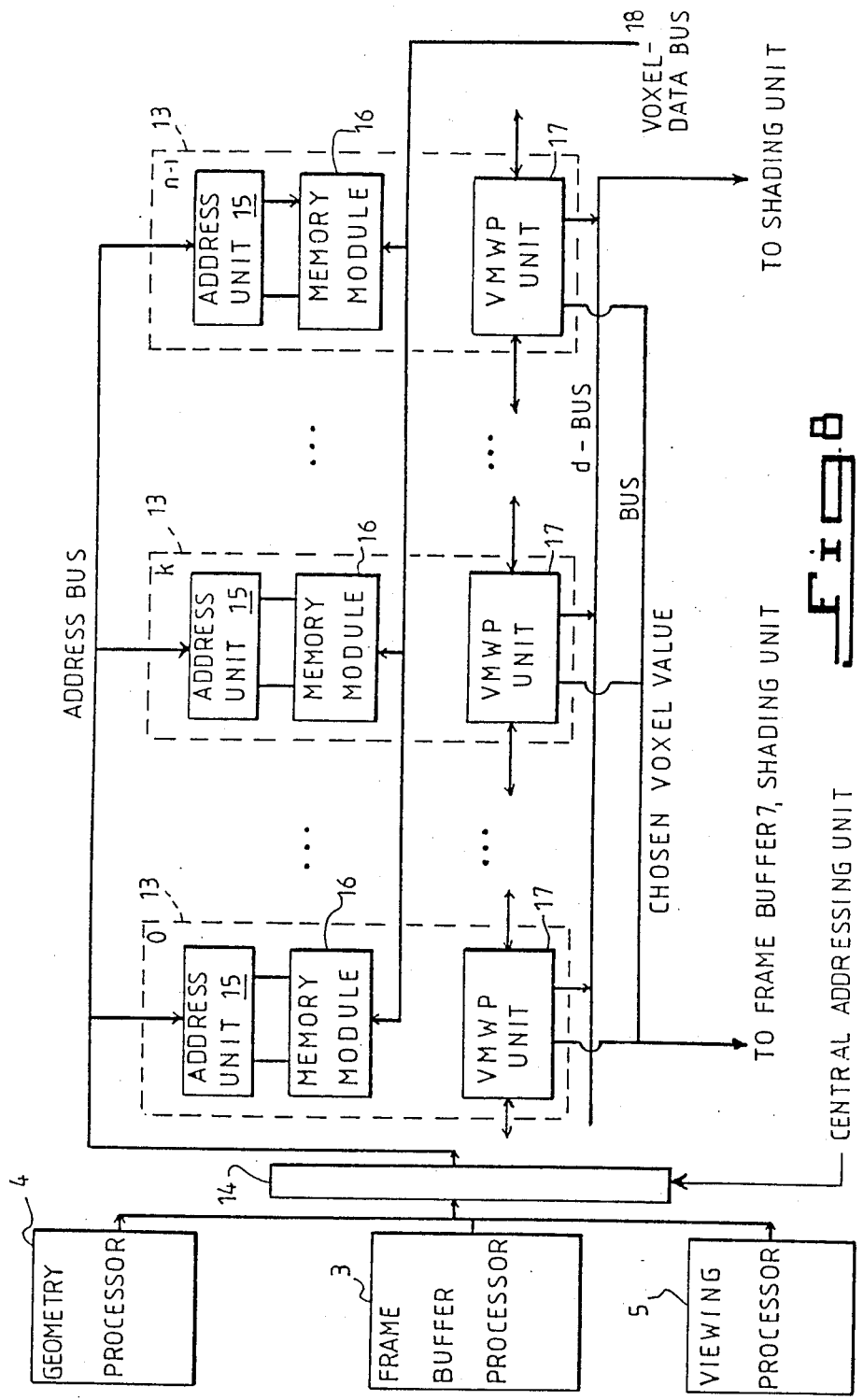

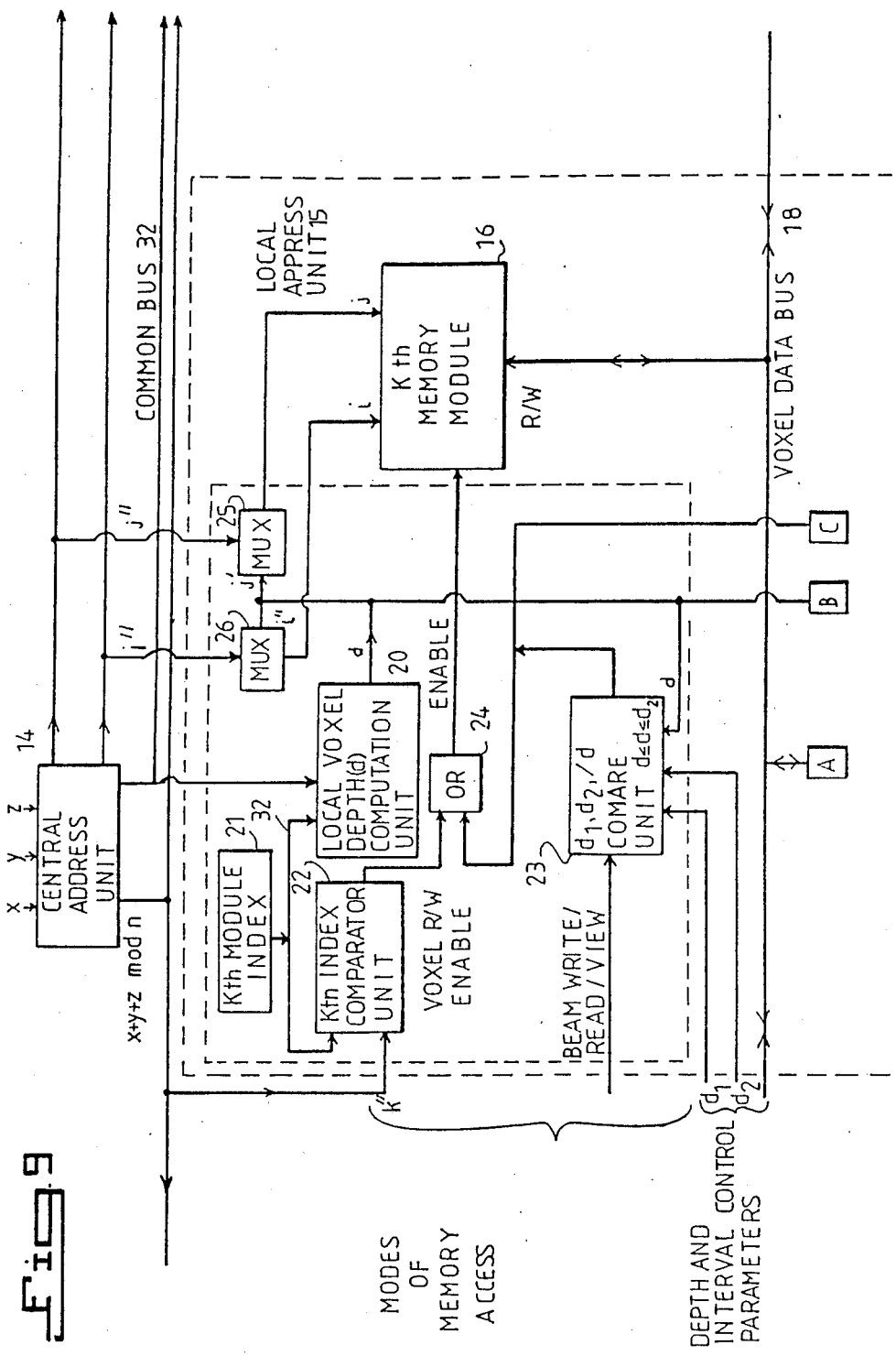

METHOD AND APPARATUS FOR STORING, ACCESSING, AND PROCESSING VOXEL-BASED DATA

FIELD OF THE INVENTION

The present invention relates generally to methods of and apparatus for storing to and accessing from a memory device, three-dimensional data. More particularly, the present invention relates to methods of and apparatus for storing and accessing voxel-based data of voxel-based imagery from a three-dimensional frame buffer memory.

SETTING FOR THE INVENTION

The need to model objects and processes in two-dimensional and three-dimensional (hereinafter 2-D and 3-D, respectively) space is manifest, and the advantages of doing so using computer graphic systems is equally as clear.

Presently, a variety of computer graphic systems are known, and for the greater part, have been characterized in terms of the data they manipulate. For example, there are systems that manipulate data represented on the continuous object (geometric) space $R^3$, there are those that operate on the discrete pixel-image plane $Z^2$, and there are those that work on the discrete voxel-image space $Z^3$.

Much energy and effort have been expended on systems using the former two approaches. An example of a system based on such techniques is a typical 2-D computer graphics raster-display system. Therein, 2-D graphical information is stored in a "graphic display list" as a structured collection of 2-D geometric primatives, representing a model of the scene or object to be modelled. A graphics/geometry processor creates the desired image on the basis of the display list. The display-list pictures are transformed, shaded, and colored, they are mapped onto the display screen, and scan-converted into an unstructured matrix of pixels, and stored within a 2-D frame buffer. A video processor then refreshes the display screen from the 2-D frame buffer. Changes in the scene require that the graphics processor repeat the whole computationally-intensive pixel-generation pipeline process, again and again. This, in turn, causes both computational and buffer contention problems which slow down the working rate of the graphics system. This phenomenon is crucial especially in real-time systems such as animation and simulation.

As a result of recent developments and research, custom hardware and geometry, video or bitblt engines are now commercially available to improve or otherwise speed-up the above-described computationally-intensive pipeline process. In conjunction with these geometry engines, or as an alternative, parallel processors have been utilized, exploiting the parallel nature of images and picture handling.

Thus, as a result of such advances in computational science and technology, it has recently become quite conventional to use three-dimensional computer graphic systems having surface and solid modelling capabilities. As with other types of graphics systems, such types of systems can be characterized by the fact that the 3-D object or scene is represented by a geometric model in 3-D continuous geometric space, $R^3$. Such 3-D geometric models are typically constructed from continuous 3-D geometric representations, including for example, 3-D straight line segments, planar polygons, polyhedra, cubic polynomial curves, surfaces, and volumes, circles, and quadratic objects such as spheres, cones, and cylinders. These 3-D geometrical representations are used to model various parts of an object, and are expressed in the form of mathematical functions evaluated over particular values of coordinates in continuous $R^3$ space. Typically, the 3-D geometrical representations of the 3-D geometric model are stored in the format of a graphical display list.

Once modelled using continuous 3-D geometrical representations, the object can be graphically displayed along a particular view direction by repeatedly scan-converting the graphical display list.

However, such 3-D geometrical-based graphic systems are not without shortcomings and drawbacks. For example, when viewing the 3-D geometrical model of the 3-D object, only the surfaces visible to an observer along a particular viewing direction should be displayed. However, to ensure this, the hidden surfaces must be detected using surface detection algorithms, and removed by a computationally intensive process referred to as "hidden surface removal". Also, for every small modification, such as for example, a change in viewing direction, the graphical display list must be manipulated and repeatedly scan-converted, which is both time consuming and computationally intensive, further limiting the technique.

Another major drawback of 3-D geometrical-based graphics systems is that projection of a 2-D view of the 3-D geometrical model, and rendering and manipulation thereof, are dependent on scene complexity.

In addition, in some applications, like in medical imaging, biology, geology and 3-D image processing, the data is already in a voxel-based form and no geometric information is available.

As an alternative to 3-D geometrical-based systems, several 3-D voxel-image space systems have been developed. In general, these voxel-image space, or voxel-based, systems are based on the concept that a 3-D inherently continuous object or scene is discretized, sampled, and stored in a large 3-D Cubic Frame Buffer (CFB) memory comprising unit cubic cells called volume elements, or "voxels". Three-dimensional objects are digitized and a regularly spaced 3-D matrix array of values is obtained and stored in the Cubic Frame Buffer. The 3-D array of voxels in the Cubic Frame Buffer is loaded with experimental data obtained by a 3-D scanner such as a CAT or MRI medical scanner, or from a voxel data base. Alternatively, the digitization is performed by scan-converting a 3-D geometrical model. Both experimental and synthetic samplings yield a cellular tessellation of the original volumes, and the resulting cellular cubic memory provides a real yet discrete model of the 3-D scene or object.

Consequently, the voxel representation, which is fundamental to all 3-D voxel-based systems, is very effective for the traditional applications employing empirical 3-D voxel imagery, such as medicine (e.g. computed tomography and ultrasounding), geology, biology, and 3-D image processing (e.g. time varying 2-D images).

The advantages of using voxel representation of objects and scenes are numerous, even if used solely for synthetic graphics, i.e. 3-D scan-conversion generated voxel objects. The projection of voxel-based images along a view direction displays only the visible surfaces and implicitly ignores the hidden surfaces of 3-D voxel-images. Also, for every small modification, there is no need of repeatedly scan-converting and manipulating "graphical display lists" as required in 3-D geometrical-based graphics systems.

Rather, a change can be made directly to the Cubic Frame Buffer images, i.e. objects can be directly edited by deleting, masking out, or adding voxels with minimal computational effort. Also, when using a voxel-based approach, projection, rendering and manipulation are independent of the scene complexity, and it is normally unnecessary to employ conventional display-lists, repeated scan-conversions, and the computationally intensive hidden surface removal or surface detection algorithms.

To date, there have been several proposals for 3-D voxel-based graphics systems, all of which have one thing in common, namely, the utilization of high performance multi-processing architectures in order to process the huge amounts of voxel-represented data in the cellular cubic memory. Examples of such prior art systems, and their shortcomings and drawbacks, will be described hereinbelow.

A 3-D voxel-based graphics system hereinafter referred to as the Voxel processor or the GODPA (General Object Display Architecture) system, is disclosed in the papers "An Architecture for the Real-Time Display and Manipulation of Three-Dimensional Objects" by S. M. Goldwasser et al. published in *Proc. Int'l. Conference on Parallel Processing* at pages 269–274, and in "A Generalized Object Display Processor Architecture" published by S. M. Goldwasser in *I.E.E.E. Computer Graphics and Applications*, Volume 4, Number 10, at pages 43–55. The GODPA system is a hierarchical hardware organization, in which a 256-cube voxel memory (8-byte per voxel) is divided into 64 symmetric equal sub-cubes. Each sub-cube is itself $64^3$ voxels, which is processed by a separate concurrent Processing Element. Each Processing Element is a pipelined arithmetic processor which outputs a double set of 128×128 image-buffer and a Z-buffer. Each image-buffer is large enough to hold the largest projected image which can be created from its associated $64^3$ sub-cube. The result is processed by 8 intermediate processors, each of which merges, based on a sequence control table, the sub-image which is generated by 8 Processing Elements. The sequence control table contains, for a desired object orientation, eight entries sorted in the required time-order defining the x, y and z offsets of the centers of the eight largest sub-cubes with respect to the center of the whole memory. The merged image of an intermediate processor is placed in the appropriate location within an intermediate double buffer. The intermediate buffers are merged by the output processor into a 512×512 double buffer, using the same control table. When one buffer is being computed, the other is being displayed. The post processor performs in real time, tone-scale table look up and gradient shading in order to enhance the realism of the image. The projection of the cube onto the 512×512 screen is accomplished by a recursive subdivision (down to the voxel level) of the cube, into eight symmetric sub-cubes and a determination of which sub-cubes will be shown on the screen. The x and y frame-buffer coordinates of each voxel are evaluated, and the pixels are written into the frame-buffer using the "painter's algorithm" for hidden surface elimination.

The GODPA system suffers from numerous shortcomings and drawbacks. For example, the GODPA system restricts its memory to be a 256-cube because of architectural reasons where it is neatly subdivided into a power-of-2 sub-cube. The GODPA system assumes that a data base of voxel-based objects exists for loading and image viewing, and is limited to operations solely in the discrete voxel image space $Z^3$. Furthermore, the GODPA system is limited to handling gray scaled images, requires a post shader to enhance their appearance, and is limited to generating parallel projections of 3-D voxel images. Also, the GODPA system requires that the source of voxel-image data be provided from a voxel data-base.

Another prior art voxel-based graphics system serving as part of a solid modelling system, is disclosed in the publication "The Graphics PARCUM (Processing Architecture Based on Cubic Memory) System: A 3-D Memory Based Computer Architecture for Processing and Display of Solid Models" by D. Jackel, published in *Computer Graphics Forum*, Volume 4, Number 4, 1985 at pages 21–32. The cube of the PARCUM system is divided or partitioned into $64^3$ macro-voxels, each of which is regioning containing $4^3$ voxels, 1 byte for each voxel. The address for a voxel consists of the region address composed of x, y and z 4-bit sub-addresses, and a 6-bit voxel address. All voxels with the same voxel address are assigned to a specific memory module each of which can be addressed separately with 12 address lines. In other words, every voxel in a macro-voxel is assigned to a different memory module. With this addressing scheme, a macro-voxel can be fetched in parallel, one voxel being retrieved from each module. The macro-voxel is then sorted into a 64-byte output data word, with an ascending address order.

The Jackel publication proposes two hardware implementations for the projection process. One is a surface detection technique which uses a ray following method realized by the address processor which contains three vector generators based on the binary rate multiplier mechanism. The vector generators are initialized by the spatial orientation parameters of the projection plane coordinates computed by the host computer. The address sequences are generated according to a search strategy enabling detection of the surface zones. The other projection process involves analytical computation of the projection plane parameters based on the multiplication of the x, y and z addresses using a transformation matrix involving matrix multiplication. As a method of rendering, the Jackel paper suggests the use of an elimination process involving the use of distance matrix used to generate in parallel vertical and horizontal gradient matrices, followed by cosine computations for diffuse and specular reflection, and concludes with the evaluation of the perceived intensity by the observer.

The PARCUM system suffers from numerous shortcomings and drawbacks as well. In particular, the memory of the PARCUM system is limited to a 256 cube because of architectural reasons where it is neatly subdivided into powers-of-2 sub-cubes. The PARCUM system's rendering capabilities are limited to color shading and does not provide for translucency. The PARCUM system is capable of only handling black and white images, and does not provide for color shading or transparency of voxel images. Furthermore, the system is limited to operation solely in the discrete voxel image space, and requires that the source of voxel-image data be provided from a voxel data base.

Another prior art voxel-based system using a 3-D P[4] (Three-Dimensional Perspective PEARY (Picture Element Array) Projection Processor) architecture for realizing an interactive animation system using solid modeling, is disclosed in the publication entitled "A Three-Dimensional Display Method for Voxel-Based Representation" by T. Ohashi et al. published in *Proc. Eurographics '85*, September 1985 on pages 221–232. The system employs projection and shading mechanism for displaying solid objects represented by a 3-D array of 256 cubed voxels arranged as a symmetric set of picture element arrays, i.e. sub-cubes, each of which is a $64^3$ voxel. The architecture is a pipeline, the first stage of which employs a set of parallel processors, one for each picture element array, to perform the projection. Projection is accomplished by directly computing the projection points of the two ends of each beam (parallel to a principal axis within each picture element array) and then using linear interpolation to approximate the in-between points. The next stage of the pipeline is a merging processor that merges the projection images into a single image using 2-D maps of color, depth and object identification. Shading is achieved with a post processor using color and depth maps. The surface gradient is first calculated by averaging seven points generating an x buffer and a y buffer, and only then the brightness is evaluated.

The Ohashi et al. system suffers from numerous shortcomings and drawbacks. For example, in particular, the voxel-based system is limited to a memory the size of a 256 cube because of architectural reasons where it is neatly subdivided into powers of two sub-cubes. The system assumes that a data base of voxel-based objects exists for loading and viewing, and its operation is limited to only the discrete voxel image space.

In response to the shortcomings and drawbacks of the above discussed voxel-based systems, applicants have proposed an alternative computer graphic system based upon voxel representation of 3-D objects in a large 3-D memory which has been described, for example, in the following publications. "A 3-D Cellular Frame Buffer," Arie Kaufman and R. Bakalash, in *Proc. EUROGRAPHICS '85*, Nice, France, September 1985, pp. 215–220; "Memory Organization for a Cubic Frame Buffer," Arie Kaufman, in *Proc. EUROGRAPHICS '86*, Lisbon, Portugal, August 1986, pp. 93–100; "Towards a 3-D Graphics Workstation," Arie Kaufman, in *Advances in Graphics Hardware I*, W. Strasser (Ed.), Springer-Verlag, 1987, pp. 17–26; "Voxel-Based Architectures for Three-Dimensional Graphics," Arie Kaufman, in *Proc. IFIP '86, 10th World Computer Congress*, Dublin, Ireland, Sept. 1986, pp. 361–366; and "CUBE—An Architecture Based on a 3-D Voxel Map," Arie Kaufman and R. Bakalash, in *Theoretical Foundations of Computer Graphics and CAD*, R. A. Earnshaw (Ed.), Springer-Verlag, 1988, pp. 689–701.

As disclosed in the above publications and generally illustrated in FIGS. 1 and 2, the proposed 3-D computer graphic workstation is based upon the 3-D voxel-based representation of objects within a large 3-D memory referred to hereinafter as a 3-D Cubic Frame Buffer, which comprises specially organized memory modules containing a cellular array of unit cubic cells called voxels. The workstation 1 is a multi-processor system with three processors accessing the Cubic Frame Buffer 2 to input sampled or synthetic data, to manipulate, to project, and to render the 3-D voxel images.

In general, the processors include a 3-D Frame Buffer Processor 3, a 3-D Geometry Processor 4, and a 3-D Viewing Processor 5. The 3-D Frame Buffer Processor 3 acts as a channel for 3-D voxel-based images which have been "scanned" using a 3-D scanner 6 such as CAT and MRI medical scanners. The 3-D scanned voxel-based images are the primary source of Cubic Frame Buffer data. Once the voxel images are stored in the Cubic Frame Buffer 2, they can be manipulated and transformed by their 3-D Frame Buffer Processor 3, which also acts as a monitor for 3-D interaction.

The 3-D Geometry Processor 4 samples and thereafter converts or maps 3-D continuous geometrical representations of a 3-D object, into their 3-D discrete voxel representation within a Cubic Frame Buffer 2. Notably, the 3-D continuous geometrical representations comprise a set of mathematical functions which, as a whole, serve as a 3-D model of the 3-D object. Together, the sampling and conversion (i.e. mapping) process is typically referred to as a "scan-conversion" process.

Referring to FIG. 3, in particular, a general overview of the 2-D and 3-D scan-conversion processes is given in terms of (i) mapping from continuous 3-D geometric models to 2-D discrete pixel image space, and (ii) mapping from continuous 3-D geometric models to 3-D discrete voxel-image space, respectively. In the above-described 3-D voxel-based systems, the 2-D scan-conversion process illustrated in FIG. 3 is not carried out as such prior art processes are strictly limited to 2-D image data based generation and 2-D pixel image modelling, whereas in contrast, the 3-D scan-conversion process provides robust 3-D image data base generation and 3-D voxel image modelling.

The 3-D Viewing Processor 5 examines the voxels in the Cubic Frame Buffer 2 in the specified view direction which can be one of a variety of directions. By taking into consideration depth, translucency and color values, the 3-D Viewing Processor 5 generates a 2-D shaded projection (i.e. video pixel image) of the cubic frame voxel-based image, inputs the same into a conventional 2-D Frame Buffer 7, which in turn is scanned by a conventional video processor 8, thereby updating a video screen 9 with the 2-D shaded pixel image. The Viewing Processor 5 also performs the viewing transformations, hidden surface removal, rendering, and allows for different viewing angles, or directions.

Producing in real-time 2-D projections of images stored in the Cubic Frame Buffer 2, depends on the specified view direction, the view position of the observer, and the viewing parameters, and involves handling a huge amount of data. In fact, in order to generate an orthographic projection of a moderate resolution (i.e. $512 \times 512 \times 8$) the data flux through the Viewing Processor 5 is enormous. To appreciate the task of the Viewing Processor, an example is in order.

Using the Cubic Frame Buffer 2 as the 3-D storage device for voxel-based representation of 3-D objects and scenes, it is expected that there are numerous ways in which to generate a 2-D orthographic projection. For example, one approach would be to scan inwards along a beam of voxels parallel to a principal axis, examining each voxel at a time, skipping over the transparent voxels until an opaque voxel is encountered, and then assigning the value of the opaque voxel to a pixel of the 2-D Frame Buffer 7, which is periodically scanned by the video processor 8. Using this technique, a full 2-D projection frame would require, on the average, the processing of half of the voxels in the Cubic Frame Buffer. Consequently, the throughput required of the Viewing Processor 5 would be enormous. For a moderate Cubic Frame Buffer resolution of 512×512×512×8, the required rate of data flow is in the order of 0.50 Giga bit/second when the Viewing Processor 5 generates a new frame in the 2-D Frame Buffer 7, only once every second. Since this rate is far beyond the capabilities of existing or forthcoming single processors, parallel processing is imperative.

A solution to the above-described "voxel-image projection problem", was proposed in applicants' above-described publications. Specifically, applicants proposed a method whereby the Viewing Processor 5 would employ a sequence of (Voxel Multiple-Write) processing units which would simultaneously process a full beam of voxels along a specified viewing direction, (each voxel in a separate processing unit), and select the first opaque voxel closest to the assumed observer viewing along that viewing direction, in a time which is proportional to the log of the length of the beam. A voxel value defined as a transparent color would be used to disable all the processing units holding transparent voxels, all the units holding opaque units would be allowed to access a common bus, each attempting to place its opaque voxel value, one byte at a time, onto the bus. The opaque value closest to the observer wins and its voxel value is transferred to the 2-D Frame Buffer 7.

Thus, by retrieving beams of voxels after beams of voxels from the Cubic Frame Buffer 2 using voxel multiple write bus, a 2-D projection of the Cubic Frame Buffer image could be generated onto a 2-D graphic display.

Consequently, a full projection of $n^3$ voxels could be generated in $O(n^2 \log n)$ time instead of the conventional $O(n^3)$ time. Thus, by handling beams of voxels instead of single voxels, the speed of the Viewing Processor 5 could be greatly increased, and the required throughput thereof be about 2 mega bit/second instead of about 0.5 giga bit/second.

However, the proposed projection method, while in theory quite simple, nevertheless posed several other problems which had to be solved in order to successfully carry out the projection method.

In particular, the time required to sequentially retrieve a single beam of 512 voxels, for example, is 52 microseconds, and the proposed projection method requires retrieval of 512 full beams of 512 voxels from a $512^3$ voxel Cubic Frame Buffer, which takes about 14 seconds, assuming a 100 nanosecond memory cycle time. Thus, it is clear that the bottleneck of applicants' proposed voxel-based system, would be the time required to retrieve a beam of voxels from the Cubic Frame Buffer 2.

To alleviate this memory accessing (i.e. storage/retrieval) problem, applicants proposed in the above-referenced publications, a specific 3-D "symmetrically-skewed" memory storage organization for the Cubic Frame Buffer 2, which could provide conflict-free access to the Cubic Frame Buffer 2 along storage/retrieval directions parallel to the x, y and z principal axes thereof.

As illustrated in FIG. 4A, the skewed memory storage organization involved sectioning the 3-D voxel space of the Cubic Frame Buffer into diagonal parallel sub-spaces having a 45° angle with respect to the main principal axes planes. According to this proposed memory organization scheme, a voxel having space coordinates x, y and z is mapped into the k-th memory module of the Cubic Frame Buffer according to the skewing function, $k=(x+y+z) \mod n$, where n is the length of one side of the nxnxn cubic memory buffer, and where each internal memory cell indice (i, j) within each k-th memory module is given by i=x, and j=y. Since two coordinates are always constant along any beam of voxels in the Cubic Frame Buffer regardless of the viewing direction, the third coordinate guarantees that only one voxel from the beam resides in any one of the memory modules.

According to this proposal, the physical memory of the Cubic Frame Buffer is divided into n memory modules, as illustrated in FIGS. 4B through 4E. To ensure that no two voxels of a beam reside in the same module, and therefore, that all the voxels of a beam can be retrieved simultaneously (i.e. in parallel) in one memory cycle, each memory module has its own independent address, k.

Thus, using this proposed memory organization, a full beam of n voxels stored away "scrambled" in n different memory modules, could be, in theory, simultaneously accessed for all three principal viewing directions, i.e. along the ±x, ±y, ±z principal axes. However, several significant problems arise from the user/viewer's point of view, when using such a memory storage scheme. Specifically, using the proposed memory storage scheme, the true voxel-based image in discrete voxel space $Z^3$, is "scrambled" and stored away in n different memory modules each having nxn memory cells, with address indices (i, j) that differ from the physical x, y and z coordinates of the voxels. Thus, as a result of the mapping operation of voxel beams into computer-storage space $N^3$, the user/viewer is wholly incapable of specifying (in terms of physically interpretable measures) that a particular beam of voxels along a particular storage/retrieval direction, is to be retrieved from the skewed Cubic Frame Buffer.

In connection with the above-described beam retrieval problem, it is noted that in the above prior art publications, this particular problem was not only not addressed, but also there was no disclosure, teaching or suggestion as to how a beam of voxels mapped into and stored within n memory modules of Cubic Frame Buffer (according to the above-described "skewed" memory storage scheme), might be retrieved therefrom, in general.

The voxel-based system proposed in applicants' prior art publications, is not without further limitations and shortcomings. In particular, the proposed system is limited to parallel projection of 3-D voxel images, along one or more of the six principal view directions: +x, −x, +y, −y, +z, −z orthographic views parallel to the principal axes. Thus, viewing of the 3-D voxel image in the Cubic Frame Buffer from more than the six principal viewing directions, requires that the 3-D voxel image in the Cubic Frame Buffer is first transformed (i.e. rotated) using the 3-D Frame Buffer Processor (an operation which distorts the 3-D voxel image), and thereafter viewing it along one of the principal orthographic directions. It is only through such a process that arbitrary parallel projections are achievable.

While the prior art publications have described the Voxel Multiple Write Bus as employing a sequence of processing units which simultaneously process a full beam of voxels and select the first opaque one in a time which is proportional to the log of the length of the beam, the details for carrying out such a concept have not been disclosed or known.

In addition, while prior art publications have sketched a general proposal of how the Cubic Frame Buffer might be organized in order to map voxel values into the memory cells of a plurality of memory modules, there has been no disclosure or suggestion as to how the Cubic Frame Buffer might be accessed in order to retrieve in a parallel fashion, a beam or an interval of voxels from the Cubic Frame Buffer, along a specified storage/retrieval direction.

There also has been no disclosure whatsoever of the details of an actual functional embodiment of the Cubic Frame Buffer memory storage organization and its addressing system, nor has such a system been known.

Moreover, while the general manner of possible operation of a Cubic Frame Buffer, a Voxel Multiple Write Bus, and a memory addressing system of a possible voxel-based system has been briefly discussed in the prior art publications, there has not been a disclosure, teaching or suggestion as to how the components of an operational Cubic Frame Buffer, Voxel Multiple Write Bus and memory addressing system could be configured to provide an operational 3-D voxel system.

In view, therefore, of prior art 3-D voxel-based graphic systems, there is a great need for 3-D voxel-based graphic systems and methods which are capable of storing in and retrieving from 3-D skewed computer storage space, beams of voxels along a wide variety of storing/retrieving (i.e. viewing) directions in 3-D discrete voxel space $Z^3$, requiring specification of the beam in $Z^3$ voxel space, and solely in terms of spatial parameters having a physical interpretation to the user.

In addition to 3-D voxel-based graphic systems which are fast, computationally efficient, and organized to simplify hardware and software implementation, there is also a great need for 3-D voxel-based graphic systems and methods capable of generating parallel projections of 3-D voxel images from a various number of viewing directions, without distorting or otherwise degrading the quality of information of such 3-D voxel images, by requiring transformation (i.e. rotation) of the 3-D voxel image stored in the Cubic Frame Buffer, prior to projection.

Accordingly, it is a principal object of the present invention to provide a method of storing in and retrieving from 3-D computer storage space, beams of voxels parallel to one of several possible conflict-free storage/retrieval directions in 3-D discrete voxel space $Z^3$, requiring specification of the beam of voxels in $Z^3$ voxel space, and solely in terms of spatial parameters having a physical interpretation to the user/observer.

It is another object of the present invention to provide a method of mapping a 3-D matrix array of voxels in $Z^3$ space, into a plurality of independently accessible memory modules with conflict-free access to beams of voxels along a plurality of storage/retrieval directions in $Z^3$ space.

It is another object of the present invention to provide a method of storing in and retrieving from 3-D computer storage space, beams of voxels along a plurality of conflict-free storing/retrieving (and viewing) directions in 3-D discrete voxel space $Z^3$, requiring specification of the voxel beam in $Z^3$ space, and solely in terms of spatial parameters having physical interpretation to the user/observer.

A further object of the present invention is to provide such a method of voxel data storage and retrieval, wherein the voxel beam is mapped from a particular conflict-free storage/retrieval direction in $Z^3$ space, into a plurality of independently accessible memory modules in skewed computer storage space according to a linear skewing function which provides conflict-free access to beams of voxels along a plurality of storage/retrieval directions.

A further object of the present invention is to provide such a method of storing and retrieving voxel-based data, wherein conflict-free access to the Cubic Frame Buffer is provided along storage/retrieval directions parallel to the x, y and z principal axes thereof, while requiring specification of the voxel beam in $Z^3$ voxel space, and solely in terms of spatial parameters, such as the physical coordinates of the voxels and their physical depth into the 3-D matrix array model of the Cubic Frame Buffer.

A further object of the present invention is to provide such a method of voxel beam storage and retrieval, wherein conflict-free access to the Cubic Frame Buffer is provided along twenty-six symmetrically disposed storage/retrieval (e.g. viewing) directions.

Another object of the present invention is to provide a method of determining which non-transparent voxel in a beam along a specified storage/retrieval direction is closest to an observer along that direction, wherein computed voxel depth measures for voxels along the beam, compete in a process to determine the closest voxel. Furthermore, the method can be used so as to determine which voxel is the closest to the observer and which satisfies observer-selected transparency control parameters, such as for example, color, translucency ratios, texture, transparency and opaqueness.

A further object is to use such a method wherein depth and interval control parameters are used to restrict the voxel depth competition process amongst those voxels falling with ranges specified by such depth and/or interval control parameter.

It is a further object of the present invention to utilize such a method in order to provide a method of projecting (from 3-D voxel-based images), 2-D voxel images along a specified viewing direction.

A further object of the present invention is to provide apparatus for storing, accessing, and processing voxel-based data.

Yet a further object of the present invention is to provide apparatus for carrying out the methods of the present invention.

An even further object of the present invention is to provide general methods and apparatus for storing, accessing, and/or processing general-purpose 3-D data in a computer system.

Other and further objects of the present invention will be explained hereinafter, and will be more particularly delineated in the appended claims, and other objects of the present invention will be apparent to one with ordinary skill in the art to which the present invention pertains.

SUMMARY OF THE INVENTION

According to the present invention, a method is provided for storing and retrieving one or more voxels of a beam disposed along one or more of a plurality of storage/retrieval directions of a 3-D matrix array and 3-D discrete voxel space. A 3-D discrete voxel space is specified in terms of x, y and z coordinate directions. In general, the method comprises storing the voxels into memory storage space, by mapping the voxels along one of the plurality of storage/retrieval directions, into a plurality of independent memory modules in the memory storage space. Each memory module is indexed by a memory module index and has internal memory cell addresses. In a preferred embodiment, the mapping is carried out in accordance with a linear skewing function expressed in terms of the x, y and z coordinate directions and integer n. The voxels are retrieved along one of the plurality of storage/retrieval directions in 3-D discrete voxel space, by demapping one or more voxels from the memory storage space into the 3-D voxel space using spatial perameters and integer n.

In the preferred embodiment the mapping of the voxels along the beam parallel to the storage/retrieval direction, is into a plurality of n independently accessible memory modules which are indexed with memory module indices $k=0, 1, \ldots n-1$. Each memory module contains $n^2$ memory cells and each memory cell is specified by an internal memory module indices i and j. The mapping is carried out in accordance with the linear skewing function of the general form $k=(ax+by+cz)$ mod n, where x, y and z are coordinate values of each voxel in 3-D discrete voxel space, where $i=x$ and $j=y$, and where a, b and c are integer coefficients and n is prime relative to the integer coefficients a, b and c and linear combinations of the integer coefficients a, b and c. Notably, the number of storage/retrieval directions in the $n^3$ matrix array in 3-D discrete voxel space is based upon the value of integers a, b, c and n.

To retrieve the voxels along one of the plurality of storage/retrieval directions in 3-D voxel space, the following procedure is performed. For each voxel along the beam parallel to the storage/retrieval direction, a voxel depth measure representative of the depth of each voxel in the $n^3$ matrix array is determined on the basis of one or more of the x, y and z coordinate values of the voxel, the integer coefficients a, b and c and the module index k of the memory module into which the voxel has been mapped. Then, for each voxel along the beam parallel to the storage/retrieval direction, the memory cell indices i and j are determined on the basis of the voxel depth measure and the x, y and z coordinate values corresponding to each voxel. Then, the voxels along the specified storage/retrievable directions are retrieved using the memory cell indices i and j determined above and the module index k.

In one embodiment of the present invention, six storage/retrieval directions corresponding to the principal axis $+-x$, $+-y$ and $+-z$ of the matrix array, are provided by setting the integer coefficients a, b and c $=1$ in order to determine the voxel depth measures for voxels along the beams parallel to the various principal axes, various demapping functions are utilized. Notably these demapping functions are derivable from the linear skewing function used in the memory storage mapping operations method.

In the preferred embodiment of the present invention, 26 storage/retrieval directions of the 3-D matrix array in 3-D voxel space are provided, by setting integer coefficients $a=5$, integer coefficient $b=2$ and integer coefficient $c=1$. In this case, the voxel depth measures for voxels along beams parallel to any one of the twenty six storage/retrieval directions, require particular demapping functions which are derivable using modular arithmetic, the linear skewing function utilized, and various techniques used in number theory. These demapping functions which provide the depth measure along the various storage/retrieval directions, have been derived for the 6 and 26 storage/retrieval directions. However, according to the principal of the present invention other methods of storage/retrieval voxels having storage/retrieval directions in excess of 26 conflict free directions utilizing the principles of the present invention.

In another embodiment of the present invention, a method of determining which voxels in a plurality of voxels along a beam parallel to a storage/retrieval direction of a $n^3$ matrix array in 3-D discrete voxel space, is closest to an observer viewing along the beam, is provided. Such a method involves the mapping of voxels as described above and also uses voxel depth measures which have been determined for a voxel on the basis of one or more of the x, y and z coordinate values of the voxel, integer coefficients a, b and c of the linear skewing function, and the module index of the memory module into which the voxel has been mapped during the mapping operation. Notably, a voxel depth measure as representative of the depth of the voxel in the matrix $n^3$ to the matrix array in 3-D voxel space. In a voxel depth measure competition process amongst the qualified voxels, the voxel depth measure which has a predetermined extreme value is determined, thereby being representative of the corresponding voxel which is close to the observer along the beam parallel to the storage/retrieval direction.

In one embodiment of the present invention a transparent parameter which is either a transparent or a non-transparent voxel value is used in order to determine which voxels will qualify for the local competition amongst the voxel depth measures.

In another embodiment of the present invention, only those voxel depth measures determined to be within a predetermined depth measure range (determined by the observer/user), are allowed to compete in the voxel depth competition process. As a result, it is possible to selectively "peel away" particular layers of voxel base images, and determine which voxels are closest on such a basis.

The above method is applied for a plurality of beams parallel to a storage/retrieval direction in order to determine a voxel depth measure for each non-transparent voxel along each beam. By comparing, for each voxel along each beam, the voxel depth measures corresponding to the non-transparent voxels it is possible to determine which voxel depth measure has a predetermined extreme value and thereby representative of corresponding non-transparent voxel which is close to the observer viewing along the beam parallel to the storage/retrieval direction. This, enables the formation of a two-dimensional image from the plurality of non-transparent voxels determined in the above process.

One aspect of the present invention concerns apparatus for storing and retrieving simultaneously, a beam of voxels disposed parallel to a storage/retrieval direction of a $n^3$ matrix array in 3-D discrete voxel space. In general, the apparatus comprises storage means for storing voxels into memory storage space by mapping the voxels along one of the plurality storage/retrieval directions, into a plurality of independently accessible memory storage modules. Each memory module is indexed by a memory module index and has internal memory cell indices. The mapping is carried out in accordance with linear skewing function expressed in terms of x, y and z coordinate directions and integer n. A retrieval means is also provided for retrieving the voxels along one of the plurality of storage/retrieval directions in 3-D voxel space, by demapping one or more of the voxels from the memory storage space, into the 3-D voxel space using spatial parameters and integer n.

In the preferred embodiment, the storage/retrieval apparatus of the present invention comprises a plurality of n modules which are indexed with memory module indices k=0, 1, ... n−1. Each k-th module includes the k-th memory module, a k-th local address unit for independently accessing a k-th memory module, and each memory cell of each k-th memory module is specified by internal module indices i and j. Each k-th local address unit includes a local depth computation unit for computing a voxel depth measure of each voxel residing in the k-th memory module. The voxel depth measure of each voxel is representative of the depth of the voxel in the $n^3$ matrix array, and is determined on the basis of one or more on the x, y, and z coordinate values of the voxel, the integer coefficient a, b, and c of the linear skewing function, and the module index k of the memory module into which the voxel has been mapped.

The local addressing unit further includes means for determining for each voxel, the memory cell indices i and j, on the basis of the voxel depth measure in the x, y and z coordinate values corresponding to each voxel. The local addressing unit also includes a memory cell selection means for selecting memory cell indices i and j. From global memory cell indices $i''$ and $j''$ and the voxel depth measures along with storage/retrieval directions.

The apparatus of the present invention also includes a central control unit having a addressing unit for generating module indices $k''$ and global memory cell indices $i''$ and $j''$.

The central addressing unit further includes means for carrying out the mapping of the voxels along the beams parallel to the storage/retrieval direction, into the plurality of an independently accessible memory modules. Notably, the mapping is carried out in accordance with the linear skewing function as discussed hereinbefore. Also provided is a means for transferring the global memory cell indices $i''$ and $j''$ from the central addressing unit to the plurality and local address units. In addition a means is provided for transferring the beams of voxels into or from the n memory modules.

In the preferred embodiment, each k-th module comprises a voxel or multiple write processing unit, a k-th voxel value storage register, a k-th voxel depth measure register, a k-th voxel depth competition unit and a writing means. The k-th value stored register is for storing the k-th voxel value of the k-th voxel along the beam parallel to the storage/retrieval direction. The k-th voxel depth measure register is for storing the voxel depth measure of the k-th voxel along the beam parallel to the storage/retrieval direction. Providing means for locally comparing the voxel depth measure of the k-th voxel of all of the voxels of the beam which is parallel to the storage/retrieval direction, and for determining which voxel depth measure has a predetermined extreme measure, and in response thereto, generating a voxel pass control signal corresponding to the voxel depth measure having the pre-determined extreme value. The writing means on the other hand, is for writing into a two dimensional frame buffer, the voxel value stored in a k-th voxel value storage register which corresponds to a voxel pass control signal.

The apparatus also includes means for providing transparency control parameters to the voxel multiple write processing units. These transparency control parameters are received by a k-th voxel transparency control unit, so as to control the local comparison of voxel depth measures within the k-th voxel depth competition unit. Notably, the voxel depth competition control is carried out on the basis of the voxel value in the k-th voxel value register in the k-th transparency control parameter.

In yet another embodiment of the present invention, the storage/retrieval apparatus is embodied within the 3-D voxel based graphic system including: a 3-D geometry processor, a 3-D frame buffer processor, and a 3-D viewing processer. The voxel based graphic system comprises a memory and addressing system for storing and retrieving an 3-D voxel based image along a plurality of storage/retrieval directions in 3-D discrete voxel space. The memory and addressing system includes a plurality of modules, wherein each module has a memory module and a local address unit for independently addressing the memory module. A central addressing unit is also provided for simultaneously transmitting to each module, broadcasted addresses and control parameters. In addition a transfer means is provided for transferring broadcast addresses and control parameters to each module, and in addition a means is also provided for transferring the voxel based images into or from the n memory modules.

The voxel-based workstation of the present invention is capable of providing a full range of inherent 3-D interactive operations in a simple, general work-bench set-up, since the workstation operates in both discrete 3-D voxel space and 3-D geometry space, and provides ways in which to interact two spaces. Accordingly, the workstation can be used with inherent 3-D user interactive devices, techniques and electronic tools, which support direct and natural interaction, generation and editing of 3-D continuous geometrical models, 3-D discrete images, and their transformations. Such a 3-D voxel-based workstation is appropriate for many 3-D applications such as medical imaging, 3-D computer-aided design, 3-D animation and simulation (e.g. flight simulation), 3-D image processing and pattern recognition, quantity of microscopy, and general 3-D graphics interaction.

BRIEF DESCRIPTION OF THE DRAWINGS

For a full understanding of the objects of the present invention, reference is made to the following detailed description of the preferred embodiment which is to be taken in connection with the accompanying drawings, wherein:

FIG. 8 is a block diagram of the 3-D voxel-based workstation of the present invention, showing three processors, a central addressing unit, and a plurality of n modules each having a local addressing unit, an independently accessible memory module, and a voxel multiple write processing unit;

FIG. 9 is a block schematic diagram of a k-th module of the apparatus for storing, accessing and processing voxel-based data according to the principles of the present invention;

DETAILED DESCRIPTION OF THE PREFERRED EMBODIMENT OF THE PRESENT INVENTION

Referring to FIGS. 6A, 6B, and 5A and 5B in particular, the method of storing and retrieving beams of voxels along a plurality of storage/retrieval directions in 3-D discrete voxel space, according to the present invention will now be described below.

Figure 1:
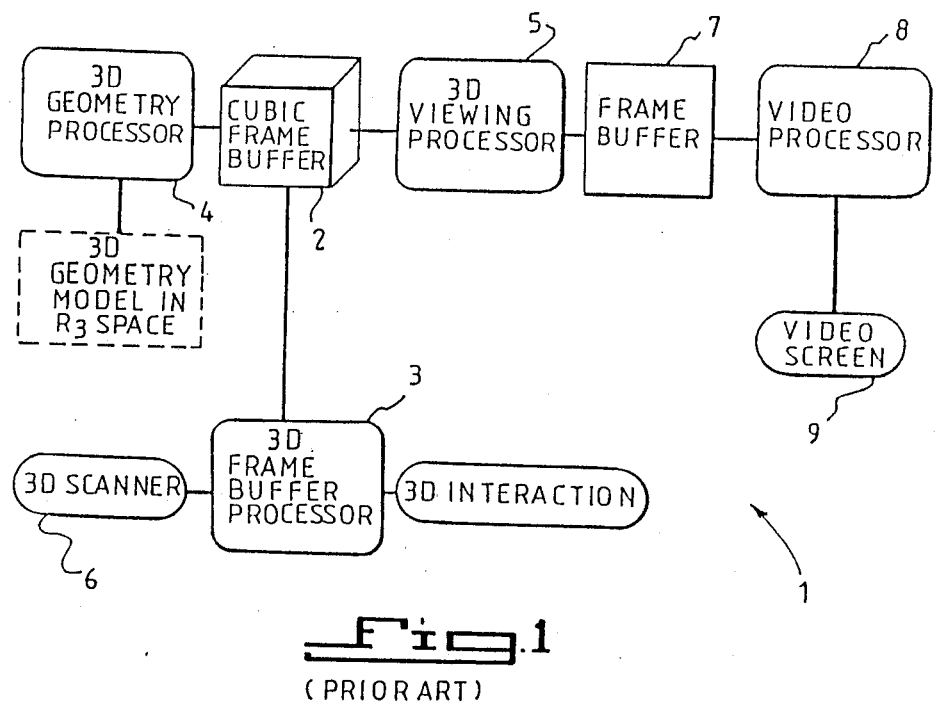
FIG. 1 is a block diagram of a 3-D voxel-based graphics workstation in which the methods and apparatus of the present invention can be carried out.
Figure 2:
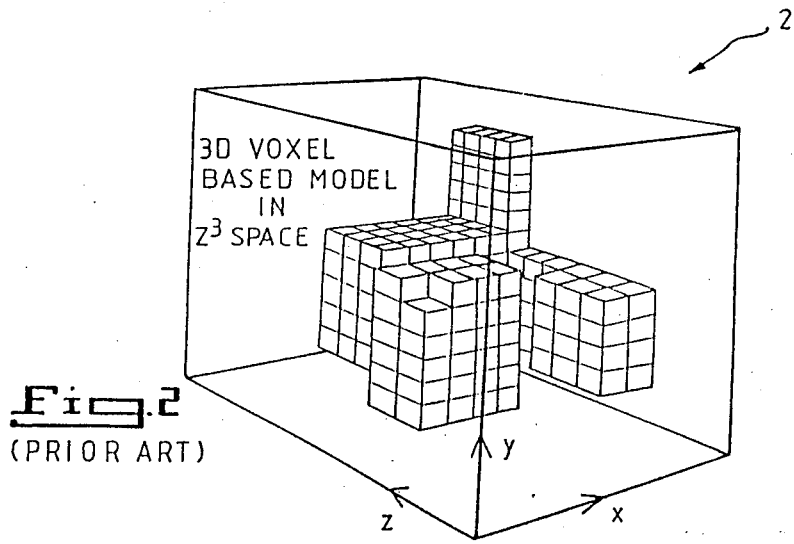
FIG. 2 is a schematic diagram of a cellular matrix array model of a 3-D Cubic Frame Buffer of the voxel-based graphics system of FIG. 1.
Figure 3:
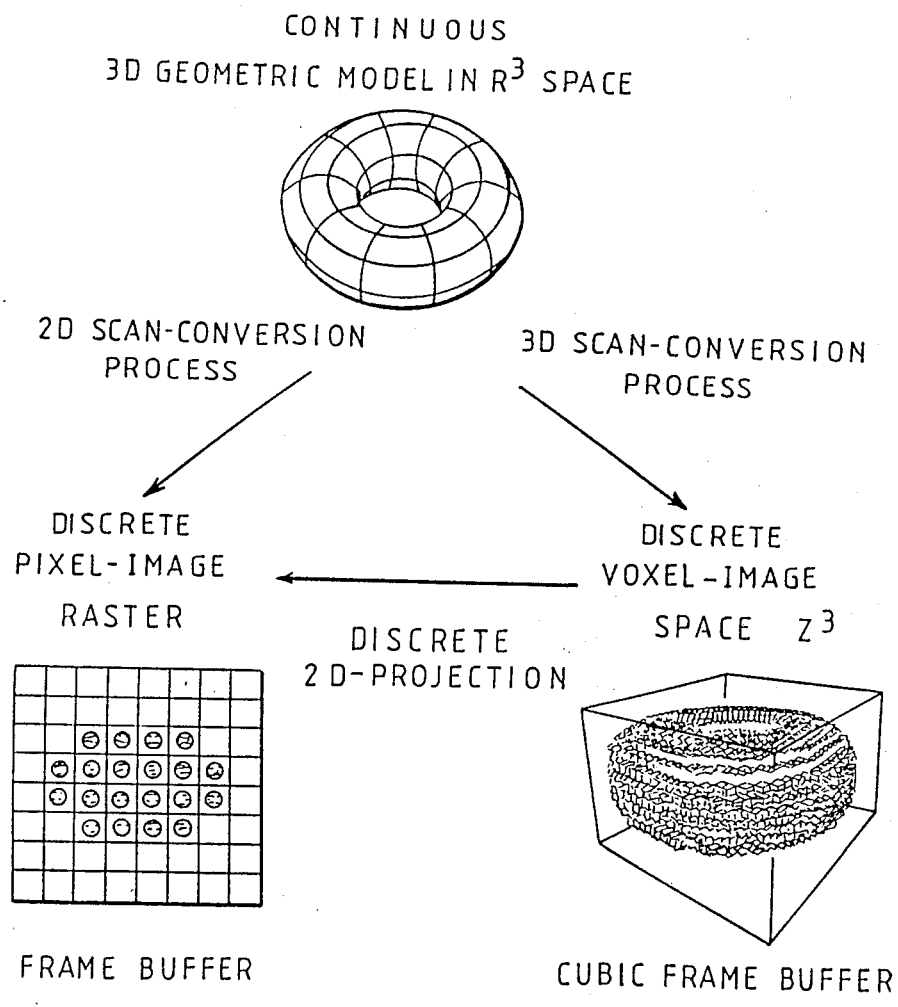
FIG. 3 is a schematic diagram illustrating 2-D and 3-D scan-conversion processes and their relationship with discrete 2-D pixel-image space and discrete 3-D voxel-image space, respectively.
Figure 4A:
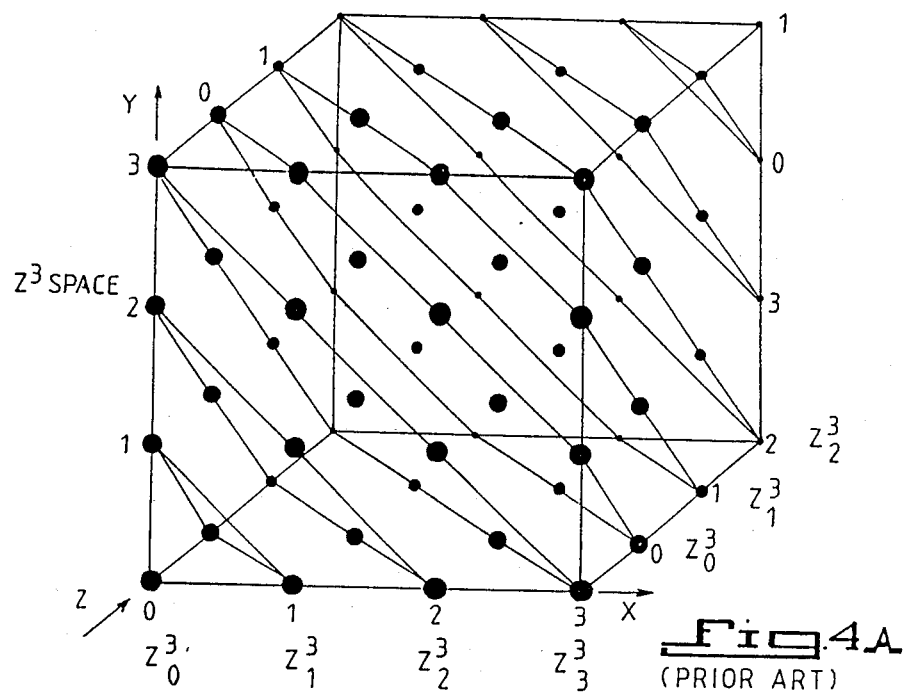
FIG. 4A is a 2-D graphical representation of the "skewed" organization of a 3-D cellular matrix array model of a 4×4×4 Cubic Frame Buffer, showing all voxels on the same diagonal section (i.e. in the same 3-D discrete voxel subspace $Z^3_k$) modulo 4 being grouped in the same memory module, and also three voxel beams in the −x, +z, and +y orthographic directions laid out separately with their respective distribution of voxels among the modules, with the internal memory cell addresses (i.e. indices) shown in parentheses.
Figure 4B:
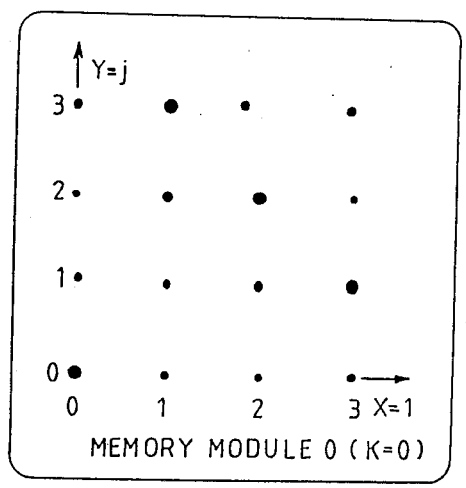
FIG. 4B is a graphical representation of the (k=0)-th memory module for the 4×4×4 Cubic Frame Buffer of FIG. 4A, showing the diagonal sections of each memory module enclosed in solid line boundaries.
Figure 4C:
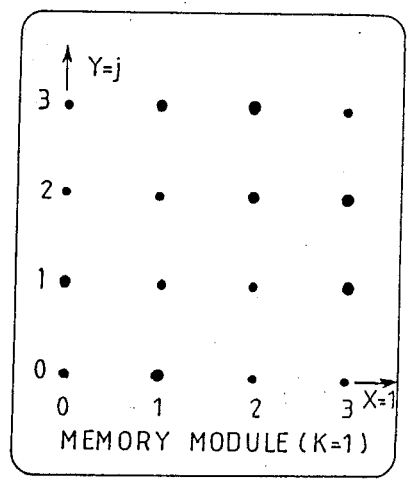
FIG. 4C is a graphical representation of the (k=1)-th memory module for the 4×4×4 Cubic Frame Buffer of FIG. 4A, showing the diagonal sections of each memory module enclosed in solid line boundaries.
Figure 4D:
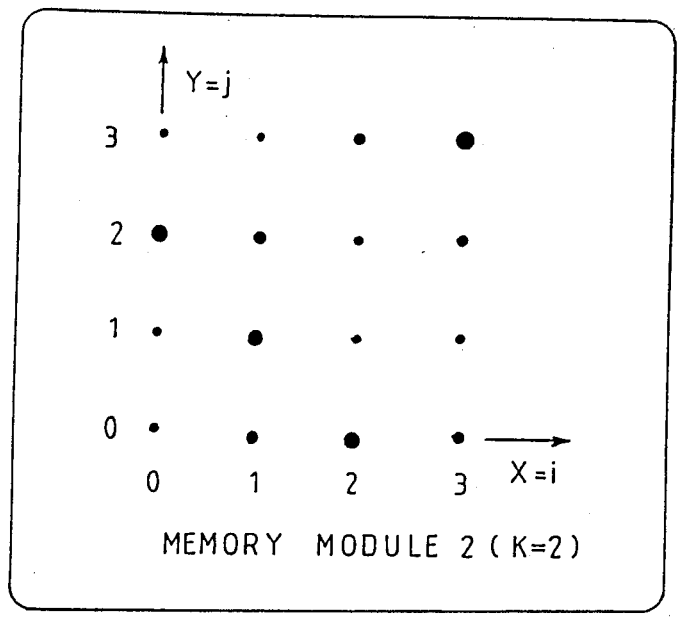
FIG. 4D is a graphical representation of the (k=2)-th memory module for the 4×4×4 Cubic Frame Buffer of FIG. 4A, showing the diagonal sections of each memory module enclosed in solid line boundaries.
Figure 4E:
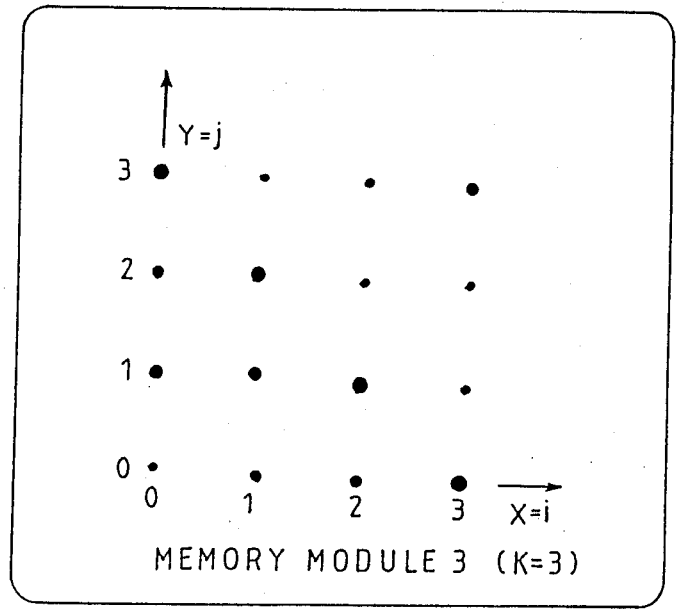
FIG. 4E is a graphical representation of the (k=3)-th memory module for the 4×4×4 Cubic Frame Buffer of FIG. 4A, showing the diagonal sections of each memory module enclosed in solid line boundaries.
Figure 5A:
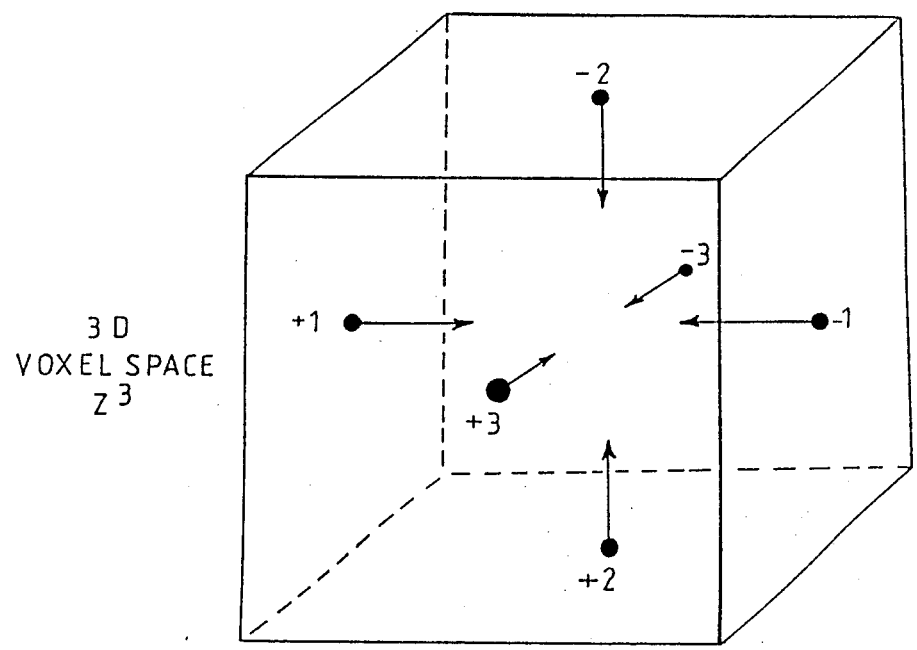
FIG. 5A is a graphical representation of a cellular matrix array model of a 3-D Cubic Frame Buffer, having six orthographic storage/retrieval (and viewing) directions.

For purposes of illustration, the case of six storage/retrieval directions parallel to the x, y and z principal axes will be considered. In FIG. 5A, a 3-D matrix array model of the Cubic Frame Buffer in 3-D voxel space $Z^3$ is illustrated, wherein the six orthographic storage/retrieval directions in $Z^3$ space are shown by directional arrows labelled $\pm 1$, $\pm 2$ and $\pm 3$ for the $\pm x$, $\pm y$ and $\pm z$ principal axes, respectively.

In $Z^3$ voxel space, each voxel has physical coordinate values x, y and z along x, y and z coordinate directions, respectively, which taken together form a 3-D matrix array. Passing through the 3-D matrix array, are strings of voxels referred to hereinafter as "beams", can also be called "rays" as well depending on the type of implementation involved. In the case where the Cubic Frame Buffer is a memory cube of $n^3$ voxels, the address indices of each voxel V(x, y, z) in a beam of n voxels $B_n$, are represented as k, i, j in 3-D computer storage space $N^3$, which will be further specified below.

In order to enable simultaneous (i.e. conflict-free) access to a full beam of n voxels in the 3-D matrix array in $Z^3$ space, regardless of the storage/retrieval direction, the large number of memory banks (i.e. modules) realizing the Cubic Frame Buffer 2, must be accessed independently in parallel. It is just this sort of memory access capability that is required in order to carry out applicants' proposed parallel projection technique involving processing a full beam of voxels at a time, in order to select the voxel along each beam which is closest to an observer viewing along a viewing direction parallel to the beams.

The speed and efficiency of such a conflict-free memory access method for "voxel beam," processing, may derive from the fact that in one memory cycle, a full beam of n voxels could be retrieved, one voxel (i.e. element) from each of the n memory banks provided in the memory storage and accessing system. However, it is a non-trivial problem to store the voxel elements of a 3-D matrix array such that all beams of voxels (e.g. along the x, y and z principal axes) can be stored and retrieved in one memory access cycle, i.e. as beams of n voxels, "without conflict".

The voxel beam storage and retrieval method of the present invention relies on a memory storage scheme that maps the voxels of a 3-D matrix array (Cubic Frame Buffer) in $Z^3$ space, into a certain number of memory modules (i.e. banks) and provides for the conflict-free access to various beams of voxels parallel to a plurality of storage/retrieval directions. Such a memory storage is dependent upon the particular storage scheme utilized. Notably, the practicality of skewing schemes, in general, depends upon whether they can be described by a small amount of tabular information, or by a simple formula.

In the method of the present invention, a general class of "periodic" skewing schemes which are linear, are used in mapping a 3-D matrix array of voxels (e.g. a 3-D voxel-based image) into a plurality of n memory modules indexed $k=0, 1, \ldots n-1$. Each k-th memory module contains $n^2$ memory cells, with each memory cell being specified by internal memory module indices i and j.

The general form of the linear skewing function S(x, y, z) is given by $$S(x, y, z) = k = (ax + by + cz) \bmod n$$

$$i = x \quad j = y$$

where x, y and z are the coordinate values of each voxel in 3-D discrete voxel space $Z^3$, $0 \leq k$, x, y, $z \leq n-1$, where a, b and c are integer coefficients, and where n is a prime relative to the integer coefficients a, b and c and to linear combinations thereof, e.g. $a-b$, $b+c$, $a+b+c$, etc.

Figure 6A:
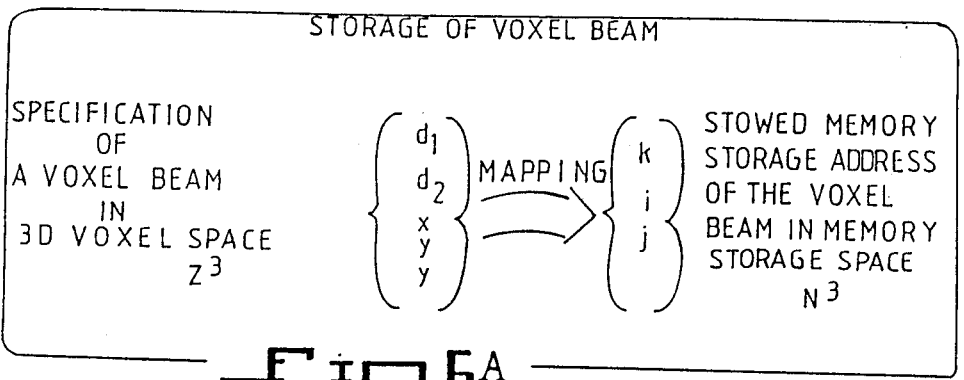
FIG. 6A is a schematic representation of the process of mapping voxel physical coordinates x, y and z in 3-D discrete voxel space, into memory module address indices k and memory cell address indices i and j, according to the principles of the present invention.

In general, the linear skewing function S maps physical coordinate values x, y and z represented in 3-D voxel space $Z^3$, into memory module storage indices k, i, j represented in 3-D skewed memory storage space $N^3$. This mapping process is illustrated in FIG. 6A, in particular.

In order that conflict-free access of voxel beams will be provided parallel to particular storage/retrieval, or viewing directions into the 3-D matrix array (i.e. Cubic Frame Buffer), it is essential to formulate the conditions on a, b, c and n such that linear skewing scheme S(x, y, z) is conflict-free on, e.g. the orthographic ±x, ±y, and ±z axes of the 3-D matrix array in $Z^3$ space. As will be explained more fully hereinafter, conflict-free access to specified storage/retrieval viewing directions can be provided for a proper choice of a, b, c and n, which can be achieved by ensuring that no two voxels along a beam parallel to a storage/retrieval direction, are mapped into the same independently accessible memory storage module K.

Referring now to FIG. 5A, the six storage and retrieval directions of the method of the present invention are specified as follows. "Rows" are referred to hereinafter as those storage/retrieval and viewing directions that are parallel to the x principal axis. "Columns" are referred to hereinafter as storage/retrieval directions that are parallel to the y principal axis, whereas, "axles" are referred to as storage viewing directions that are parallel to the z principal axis.

By utilizing a 3-D memory device comprising n independently addressable memory modules having $n^2$ memory cells each, it is clear then, that conflict-free access to beams of voxels parallel to any one of the six storage/retrieval directions specified in FIG. 5A, will be provided by guaranteeing that no two voxels in a beam parallel to one of the storage/retrieval directions reside in that same k-th memory module.

To more fully appreciate the method of the present invention, it will be helpful to briefly discuss several basic concepts in number theory, for example, the concept of the greatest common divisor, and the concept of "relatively prime", are in order.

Every integer which divides all the integers a, b, ..., 1 is said to be a "common divisor" of them. The largest of these common divisors is said to be their "greatest common divisor" (i.e. gcd) and is denoted in the mathematics of number theory, by the symbol (a, b, ..., 1) = 1, and hereinafter by a somewhat more redundant notation: gcd (a, b, ... 1). In view of the finiteness of the number of common divisors, the existence of the "greatest common divisor" is evident. In this regard, a few definitions are in order. If gcd (a, b, ... 1) = 1, then a, b, ... 1 are said to be "relatively prime", which signifies that there is no divisor, except for 1, which is common to a, b, ..., 1.

If each of the numbers a, b, ... 1 is relatively prime to any other of them, then a, b, ..., 1 are said to be "pairwise prime". It is thus evident that pairwise prime numbers are also relatively prime, and in the case of two numbers, the concepts of "pairwise prime" and "relatively prime" coincide.

In the preferred embodiment hereof, the linear skewing scheme S(x, y, z) is "proper" in that all memory modules are used in the mapping operation. The "proper" condition of the linear skewing scheme S(x, y, z) is satisfied if and only if integer coefficients a, b and c are "relatively prime" with respect to n. This "relatively prime" condition for proper linear skewing schemes can be expressed alternatively as follows: The greatest common divisor (i.e. "gcd") of integer coefficients a, b, c and n must be equal to one, i.e. gcd (a, b, c, n) = 1.

According to such a linear skewing scheme, the voxels of a beam along a row of the 3-D matrix array (e.g. parallel to the +x principal axis, with y and z fixed constant) are placed or "ordered" in successive memory modules which are "a" apart mod n, and are termed a-ordered voxels. Similarly, the voxels of a beam along a column of the 3-D matrix array (e.g. parallel to the +y principal axis, with x and z fixed constant are placed in successive memory modules which are b apart mod n, termed b-ordered voxels. Also, those voxels of a beam along an axle of the 3-D matrix array (e.g. parallel to the +z principal axis, with x, y fixed constant) are placed in successive memory modules c apart mod n, and are termed c-ordered.

For a proper choice of a, b, c and n, the linear skewing function $k = (ax + by + cz) \bmod n$ provides conflict-free access to all rows, columns and axles of the 3-D matrix array. Having specified the a, b and c ordering of the voxels along the ±x, ±y and ±z principal axis of the 3-D matrix array in FIG. 5A, and the condition gcd (a, b, c, n) = 1, these specifications suggest the selection of a, b, c and n as follows:

$$a = b = c = 1.$$

Consequently, n can be any number, e.g. preferably any power of 2 as this simplifies memory construction, addressing, and/or the modulo computation in the linear skewing function S(x, y, z). Notably, other selections of a, b, c and n can satisfy the condition gcd (a, b, c, n) = 1.

Thus, the linear skewing function of $k = (x + y + z) \bmod n$, performs a mapping of a 3-D matrix array in $Z^3$ space, into a plurality of n memory modules of $n^3$ memory cells in 3-D computer storage space $N^3$, whereby six conflict-free storage/retrieval directions along the principal axes are provided.

After having mapped (i.e. stored) beams of voxels (characterized by x, y and z coordinates) from $Z^3$ voxel space into 3-D computer storage space $N^3$ (characterized by memory storage cell address indices k, i, j), using the above-derived proper linear skewing function, a user/observer typically has a natural need to retrieve the stored beam of voxels from 3-D computer storage space $N^3$, by demapping the beam of voxels in 3-D voxel space $Z^3$, for processing and/or viewing. However, as discussed hereinbefore, this poses a problem regarding voxel beam retrieval, namely, that individual voxels of a beam once accurately represented in discrete voxel space $Z^3$ have been scrambled and stored away in n different memory modules having nxn memory cells with address indices i, j that differ from the physical x, y, and z coordinates of the voxels. In short, the user/viewer is incapable of specifying the memory storage addresses corresponding to a particular voxel beam which is to be retrieved along a particular conflict-free storage/retrieval direction.

Figure 6B:
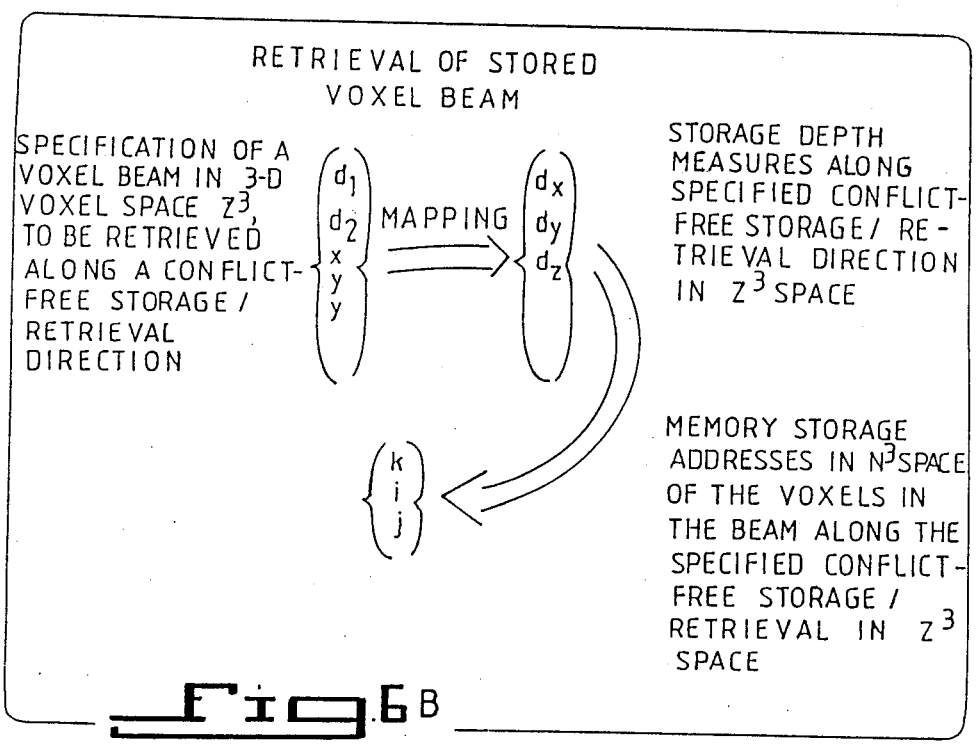
FIG. 6B is a schematic representation of a process of demapping the physical x, y and z coordinates of a voxel mapped into the k-th memory module, into a voxel depth measure, d, along a particular storage/retrieval (i.e. viewing) direction, and subsequently into the memory address indices k, i, j, according to the principles of the present invention.

Reference is now made to FIG. 6B in particular, wherein a "demapping" process is illustrated for retrieving a voxel beam mapped into skewed memory storage space $N^3$, according to the principles of the present invention.

In general, applicants have discovered an effective way in which to overcome the above-described voxel-beam retrieval problem, such that a whole beam of voxels mapped into computer storage space $N^3$ according to a particular linear skewing function, can be retrieved from skewed storage space $N^3$ by a process demapping the voxel beam back into 3-D voxel space $Z^3$, while requiring that the specification of the beam of voxels be on voxel space $Z^3$ and solely in terms of spatial parameters having a physical interpretation to the user/observer.

In the preferred embodiment, the spatial parameters that have been selected for voxel-beam retrieval specification are (i) the physical coordinate direction of the voxel beam, and (ii) the physical depth of the beam into the 3-D matrix array model of the Cubic Frame Buffer. These spatial parameters are natural in that they have a physical interpretation, namely they specify the direction of the voxel beam, and also the depth of the voxels in the beam extending into the 3-D matrix array along the specified storage/retrieval (e.g. viewing) direction.

According to the method of the present invention, the demapping process involves specifying along which of the six storage/retrieval directions, the voxel beam (to be retrieved) extends into the 3-D matrix array in $Z^3$ space. For the case of retrieving the voxel beam along the +x storage/retrieval direction, the user/observer needs only to specify a constant value of y and z, e.g. $y_o$, $z_o$, respectively, and compute depth measure of each voxel (referred to hereinafter as "voxel depth measure d") on the basis of spatial parameters, such as x, y and z, and the memory module index k=0, 1, ... n−1. Notably however, the voxel which is, for example, five (5) units deep into the 3-D matrix array in 3-D voxel space $Z^3$, is not in the memory module k=5, but has been mapped into some other memory module according to the linear skewing function S(x, y, z).

In order to compute the voxel depth measure values d of the beam parallel to the +x coordinate direction, a demapping function is derived from the linear skewing function S(x, y, z) =(x+y+c) mod n by manipulating the same using known "modular arithmetic" principles and operations. For a discussion of the involved principles and operations of modular arithmetic, reference is made to "Elements of Number Theory" by I.M. Vinogradov, translated from the Fifth Revised Edition (1949) by Saul Kravetz, published by Dover Publications in 1954. The result of the manipulation of the linear skewing function is a demapping function which provides the voxel depth measure $d_x$ along the +x storage/retrieval direction as follows:

$$d_x = (k - (y+z)) \bmod n.$$

Thus by evaluating in parallel, the voxel depth function $d_x$ for all values of memory module k=0, 1, ... n−1, the memory storage addresses, or indices, for the entire beam to be retrieved (i.e. accessed) along the specified storage/retrieval direction, are given by $i=d_x$, $j=y$ for k=0, 1, 2 ... n−1.

When retrieving the voxel beam along the −x storage/retrieval direction, the corresponding voxel depth measure parallel to that direction $d_x$ can be computed by $$d_{-x} = n - d_{+x} - 1.$$

In a similar fashion as described above, demapping functions for providing voxel depth measures of voxels of beams along the ±y and ±z coordinate directions can be derived in the form as follows:

$$d_{+y} = (k - (x+z)) \bmod n$$

$$d_{-y} = n - d_{+y} + 1$$

$$d_z = (k - (x+y)) \bmod n$$

$$d_{-z} = n - d_{+z} - 1.$$

By evaluating in parallel, the voxel depth functions $d_{\pm y}$ or $d_{\pm z}$, for all values of memory modules indices k=0, 1, ... n−1, the memory storage addresses for the beam to be retrieved along the specified storage/retrieval direction, are determinable in a manner described above.

Figure 5B:
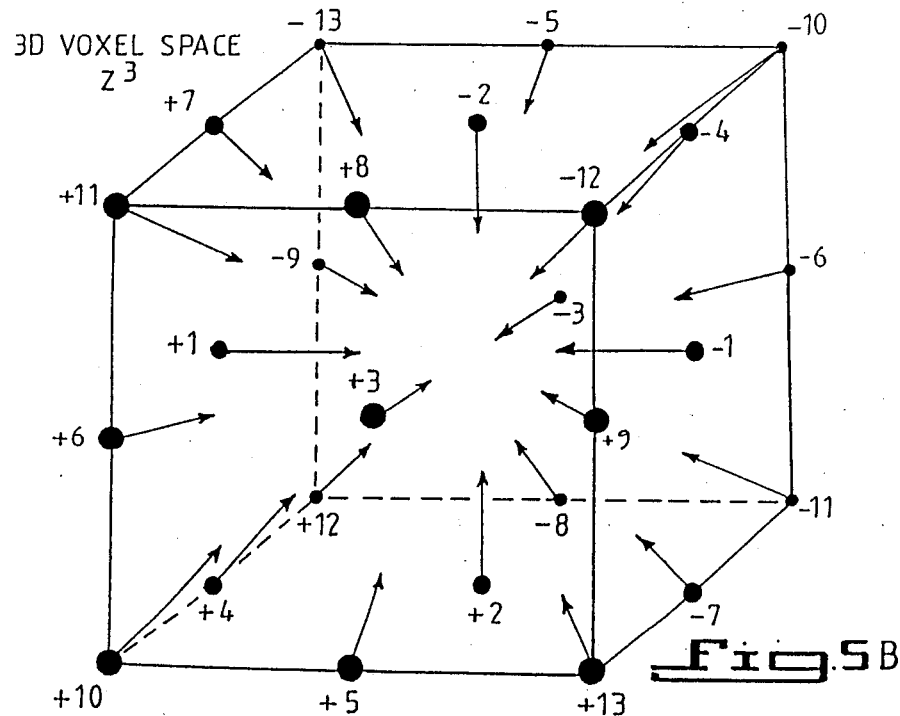
FIG. 5B is a graphical representation of a cellular matrix array model of a 3-D Cubic Frame Buffer, having twenty-six storage/retrieval (and viewing) directions.

Referring now to FIG. 6A, 6B, and FIG. 5B in particular, the case of twenty-six conflict-free storage/retrieval directions of a 3-D matrix array in 3-D voxel space $Z^3$, will be considered.

In FIG. 5B, a 3-D matrix array model of the Cubic Frame Buffer in 3-D voxel space $Z^3$ is illustrated, wherein the twenty-six storage/retrieval directions in $Z^3$ space are shown by directional arrows labelled ±1 for the rows parallel to the ±x principal axes, ±2 for the columns parallel to the ±principal axes, and ±3 for the axles parallel to the ±z principal axes. The other additional twenty storage/retrieval directions are specified along the minor-diagonals represented by directional arrows ±4, ±5, ±6, the minor-anti-diagonals represented by directional arrows ±7, ±8, ±9, major-diagonals represented by directional arrows ±10, ±12, and major anti-diagonals represented by directional arrows ±11, ±13.

As in the case of six conflict-free storage/retrieval directions, the voxel beam storage and retrieval method of the present invention relies on a memory storage scheme that maps the voxels of a 3-D matrix array (Cubic Frame Buffer) in 3-D voxel space $Z^3$, into n independently accessible memory storage modules, which provides for conflict-free access to beams of voxels parallel to any one of twenty-six storage/retrieval directions. Again, the storage mapping process utilizes a linear skewing function of the following general form:

$$k = (ax + by + cz) \bmod n$$

where $0 \leq k, x, y, z \leq n-1$.

To ensure the conflict-free access to rows, columns and axles, the condition gcd (a, b, c, n) = 1 must be maintained. For a proper choice of a, b, c and n, the above-skewing function will map the voxels of a 3-D matrix into n independently accessible memory modules, so as to provide conflict-free access to all rows, columns, axles, major and minor diagonals and anti-diagonals.

In order to provide a storage scheme such that a beam of voxels can be retrieved conflict-free from memory storage space, along any one of the twenty-six storage/retrieval directions in $Z^3$ space specified above, it has been discovered that the following voxel ordering conditions must be satisfied, namely:

The voxels of a row are placed (i.e. mapped into, or "ordered") in successive memory modules which are "a apart modulo n", termed a-ordered. The voxels of a column are placed in successive memory modules "b apart modulo n", termed b-ordered. The voxels of an axle are placed in successive memory modules "c apart modulo n", termed c-ordered. The voxels of major diagonals are placed in successive memory modules "(a+b+c) apart modulo n", termed (a+b+c)-ordered, and "a+b−c apart modulo n", termed (a+b−c)-ordered. The voxels of a major anti-diagonal are placed in successive memory modules "(a+b−c) apart modulo n", termed (a+b−c)-ordered, and "a−b+c apart modulo n", termed (a−b+c)-ordered. The voxels along minor diagonals and anti-diagonals are placed in successive memory modules "(a+b) apart modulo n", termed (a+b)-ordered, "(a−b) apart modulo n" termed (a−b)-ordered in the x-y faces, are (a+c)-ordered, and (a−c)-ordered in the y-x faces, and the voxels are termed (b+c)-ordered and (b−c)-ordered in the y-x faces. The voxels along the positive and negative directions of the same beam have the same "order".

In view of the above voxel-ordering conditions that must be satisfied for the case of twenty-six conflict-free storage/retrieval directions, the selection of integer coefficients a, b, c and n are restricted. Such restrictions can be formulated in terms of Basic Concepts of Divisibility Theory, and in particular, in terms of the concept of the "Greatest Common Divisor" (i.e., gcd), the theoretical foundations of which are discussed in detail in Chapter 1, Section 2 of *Elements of Number Theory* by I. M. Vinogradov.

The restrictions imposed on a, b, c and n for the case of the above specified twenty-six storage/retrieval directions of the 3-D matrix array in voxel space $Z^3$, are given as follows.

$a \neq b \ \ a \neq c \ \ b \neq c \ \ a+b \neq c \ \ a \neq b+c \ \ b \neq a+c$ (1)

gcd (a,n) = 1  gcd (b,n) = 1  gcd (c,n) = 1 (2)

gcd (a+b+c, n) = 1  gcd (a+b−c, n) = 1 (3)

gcd (a−b−c, n) = 1  gcd (a−b+c, n) = 1 (3)

gcd (a+b, n) = 1  gcd (a−b, n) = 1 (4)

gcd (a+c, n) = 1  gcd (a−c, n) = 1 (5)

gcd (b+c, n) = 1  gcd (b−c, n) = 1 (6)

For example, a = 5, b = 2 and c = 1 satisfy equations (1), and thus the general skewing function becomes $$k = (5x + 2y + z) \bmod n.$$

Notably, integer n is selected so as to satisfy the greatest common divisor equations (2) through (6). Accordingly, to realize a $512^3$ voxel Cubic Frame Buffer 2, n can be selected, for example, from integers n = 509 or n = 517, which are both "prime relative to" integers c = 1 through integer (a+b+c) = 8, as required by the relatively prime conditions formulated in equations (2) through (6).

Having now specified one set of integer coefficient values for a, b, c, and n in the generalized linear skewing function S(x, y, z), the voxels in the 3-D matrix array in voxel space $Z^3$ can be mapped into memory storage space $N^3$ as discussed hereinbefore. Once mapped into $N^3$ storage space, the voxels or beam thereof along one of the twenty-six conflict-free storage/retrieval directions in $Z^3$ space, can be retrieved by a demapping process involving demapping of the voxels from $N^3$ storage space into $Z^3$ voxel space using spatial parameters and integer n. The details of this demapping operation in the voxel beam retrieval process, will now be described below in detail for the case of twenty-six conflict-free storage/retrieval directions.

As with the case of six conflict-free storage/retrieval directions, retrieval of one or more voxels of a beam in 3-D voxel space $Z^3$, requires, according to the principles of the present invention, determination of the memory storage addresses (in $N^3$ storage space) of the voxels of the beam to be retrieved parallel to one of the twenty-six conflict-free storage/retrieval directions.

However, since the voxels stored away in memory storage space $N^3$ are "scrambled" as a result of the skewed storage mapping, determination of the memory storage addresses of the voxel beam is not straightforward, and requires that a different demapping operation be carried out for retrieval along each of the twenty-six storage/retrieval directions. Thus, specification of those demapping operations for thirteen viewing directions is provided below, for positively specified storage/retrieval direction, noting that the demapping operations for the negatively specified "antiparallel" storage/retrieval directions are derivable in a straightforward manner. For purposes of illustration, integer n representative of the number of independently accessible memory modules, is taken to be 517, for the linear skewing function:

$$S(x, y, z) = k = (5x + 2y + z) \bmod 517$$

and x = i and y = j.

In order to access a beam of voxels along "rows" in the 3-D matrix array (i.e. parallel to the x-axis), storage/retrieval direction No. +1 illustrated in FIG. 5B is utilized. As illustrated in FIG. 5B, each row in the 3-D matrix array is defined by coordinate $y = y_o$ and coordinate $z = z_o$. Along this storage/retrieval direction, internal memory cell address $j = y = y_o$, and each memory module address k along the row specifies a different i = x, which is the voxel depth measure $d_x$, i.e. distance from the observer along the +x axis.

To derive a mathematical expression for $d_{+x}$ which is a demapping function, the linear skewing (i.e. mapping) function k = (5x + 2y + z) mod 517 is manipulated using modular arithmetic operations, (which are different from conventional algebra), to obtain the following congruence:

$$5x = k - (2y+z) \mod 517.$$

In order to obtain x alone on the left side of the above expression, which represents the voxel depth measure $d_{+x}$, resort must be made to the fundamental properties of fractions, and in particular the theory of Continued Fractions, to which reference is made in Chapter 1, Section 4 of *Elements of Number Theory*.

The ratio of n/a, e.g. 517/5, can be developed into a continued fraction n/a of the form $$\frac{n}{a} = q_1 + \cfrac{1}{q_2 + \cfrac{1}{q_3 + \cdots}} + \frac{1}{q_n}$$

where, the numbers $q_1, q_2, \ldots$ which occur in the expansion of the number n/a in the continued fraction, are called the partial quotients, and the fractions, $$\delta_1 = q_1, \delta_2 = q_1 + \frac{1}{q_2}, \delta_3 = q_1 + \cfrac{1}{q_2 + \cfrac{1}{q_3}}, \ldots$$

are called the convergents. Since the continued fraction n/a is a rational number, the above process will be terminated.

In order to simplify forming the convergents, the convergents can be represented recursively in the following way.

$$\delta_s \frac{q_s P_{s-1} + P_{s-2}}{q_s Q_{s-1} + Q_{s-2}} = \frac{P_s}{Q_s}$$

Thus the numerators and the denominators of the convergents can be recursively calculated by means of the formulae $$\begin{cases} P_s = q_s P_{s-1} + P_{s-2}, \\ Q_s = q_s Q_{s-1} + Q_{s-2}. \end{cases} \quad (2)$$

These calculations can easily be carried out by means of the following scheme:

| $q_s$ |   | $q_1$ | $q_2$ | ... | $q_s$ |   |   | $q_r$ |   |
|---|---|---|---|---|---|---|---|---|---|
| $P_s$ | 1 | $q_1$ | $P_2$ | ... | $P_{s-2}$ | $P_{s-1}$ | $P_s$ | ... | $P_{r-1}$ | n |
| $Q_s$ | 0 | 1 | $Q_2$ | ... | $Q_{s-2}$ | $Q_{s-1}$ | $Q_s$ | ... | $Q_{r-1}$ | a |

Notably, r equals the number of steps required to carry out the recursive calculation of the convergents.

Having developed the function n/a in a continued fraction, and considering the last two convergents, $$\frac{P_{m-1}}{Q_{m-1}}, \frac{P_m}{Q_m} = n/a$$

by the properties of congruences in one unknown (discussed in Chapter IV, Section 2, of *Elements of Number Theory*), the following congruence of the general form $$A\ x = B \mod n$$

can be expressed as $$x = ((-1)^{r-1} \cdot P_{r-1} B) \mod n$$

which, for convenience of notation, will be represented as $$x = (T(n/A) \cdot B) \mod n$$

Thus, using the above moduli relationships, the congruence $5x = k - (2y+z) \mod 517$ can be expressed as $$x = 207\ (k - 2y - z) \mod 517 = d_x.$$

where T (517/5) = 207.

Accordingly, using $d_x$, $j = y = y_o$ and $z = z_o$ for k = 0, 1, ... n − 1, all of the addresses k, i, j of the voxels along the +x direction are specified, and thus the full beam of voxels can be retrieved along the storage/retrieval direction No. +1 (illustrated in FIG. 5B) in terms of spatial parameters, i.e. $y_o$ and $z_o$, and integer k.

To determine the voxel depth value $d_{-x}$ along the −x axis, $d_{-x}$ is simply computed by the following formula:

$$d_{-x} = n - d_{+x} - 1.$$

For the general case of voxel beam retrieval along storage/retrieval direction No. +1, where the skewing function $k = (ax + by + cz) \mod n$ is employed in storage mapping operation, the derived congruence $$ax = (k - by - cz) \mod n$$

can be manipulated as hereinbefore described, to provide the voxel depth measure $d_{+x}$ as $$d_{+x} = x = (T(m/a)(k - by - cz)) \mod n.$$

In order to access a beam of voxels along "columns" in the 3-D matrix array (i.e. parallel to the y-axis thereof), storage/retrieval direction No. +2 illustrated in FIG. 5B is utilized. As illustrated in FIG. 5B, each column in the 3-D matrix array is defined by coordinate $x = x_o$ and coordinate $z = z_o$. Along this storage/retrieval direction, internal memory cell address $i = x = x_o$, and each memory module address k along the column specifies a different $j = y$, which is the voxel depth measure $d_{+y}$, i.e. distance from the observer along the +y axis. Using a procedure similar to that employed hereinabove, the depth measure $d_{+y}$ is obtained as:

$$d_{+y} = y = -258\ (k - (5x + z)) \mod 517$$

for n = 517, a = 5, b = 2, c = 1, and T (517/2) = −258.

For the general case of voxel beam retrieval along storage/retrieval direction No. +2, where the skewing function $k = (ax + by + cz) \mod n$ is employed in storage mapping, the derived congruence $$by = k - (ax + cy) \mod n$$

can be manipulated as hereinbefore described, to provide the voxel depth measure $d_{+y}$ as $$d_{+y} = y = T(n/b)(k - ax - cz) \mod n.$$

In order to access a beam of voxels along "axles" in the 3-D matrix array (i.e. parallel to the z-axis), storage/retrieval direction No. +3 as illustrated in FIG. 5B is utilized. As illustrated in FIG. 5B, each axle in the 3-D matrix array is defined by coordinate $x=x_o$, and coordinate $y=y_o$. Along this storage/retrieval direction, internal memory cell address $i=x=x_o$ and $j=y=y_o$, and each memory module address k along the axle specifies a different z, which is the voxel depth measure $d_{+z}$, i.e. the distance from the observer along the +z axis. Using a procedure similar to that employed hereinabove, the depth measure $d_{+z}$ (used also in viewing and shading) is obtained as:

$$d_{+z}=z=(k-5x-2y) \bmod 517 \text{ for } n=517, a=5, b=2, \text{ and } c=1.$$

To determine the voxel depth value $d_{-z}$ along the $-z$ axis, $d_{-z}$ is simply computed by $d_{-z}=n-d_{+z}-1$.

For the general case of voxel beam retrieval along storage/retrieval direction No. +3, where the skewing function $k=(ax+by+cz) \bmod n$ is employed in the storage mapping operation, the derived congruence $$cz=(k-(ax+by)) \bmod n$$

can be manipulated as hereinbefore described, to provide the voxel depth measure $d_{+z}$ as $$d_{+z}=z=(T(n/c)(k-ax-by)) \bmod n$$

Accessing a beam of voxels along "the minor diagonal" in the 3-D matrix array specified by storage/retrieval direction No. +4, is now considered. As illustrated in FIG. 5B, each minor diagonal in the 3-D matrix array is defined by equation x-y=constant, and coordinate $z=z_o$. The fact that x-y= constant provides two options for determining the depth along the beam. According to the first option, along this storage/retrieval direction, each memory module address k specifies a different coordinate y, which is proportional to the distance $d_y$ from the observer along the minor diagonal. Alternatively, each memory module address k also specifies a different coordinate x, which is proportional to the distance $d_x$ from the observer along the minor diagonal.

The case where each k along the minor diagonal specifies a different y coordinate, will be considered. Using a procedure similar to that employed hereinbefore, the depth measure $d_{+y}$ is obtained as $$d_{+y}=y=(74(k-5(x-y)-z)) \bmod 517$$

for $n=517$, $a=5$, $b=2$, $c=1$, and $T(517/7)=74$. For the general case of voxel beam retrieval along storage/retrieval direction No. +4, where the skewing function $k=(ax+by+cz) \bmod n$ is employed in the storage mapping operation, the derived congruence $$k=(ax-ay+(a+b)y+cz) \bmod n$$

can be manipulated to provide $$(a+b)y=(k-(a(x-y)+cz)) \bmod n$$

from which the voxel depth measure $d_y$ can be derived using modular arithmetic:

$$d_{+y}=y=\left(T\left(\frac{n}{a+b}\right)(k-a(x-y)-cz)\right) \bmod n$$

Alternatively, for the second option discussed above, $d_x$ is provided by:

$$d_{+x}=x=\left(T\left(\frac{n}{a+b}\right)(k-b(x-y)-cz)\right) \bmod n.$$

Accessing a beam of voxels along the minor diagonal specified by storage/retrieval direction No. +5 in the 3-D matrix array, will now be considered. As illustrated in FIG. 5B, each such minor diagonal is defined by equation y-z= constant, and coordinate $x=x_o$. The fact that x-y equals a constant, provides two options for determining the depth along the beam. According to the first option, along this storage/retrieval direction, each memory module address k along the minor diagonal specifies a different coordinate z, which is proportional to the distance $d_{+z}$ from the observer along this minor diagonal. Alternatively, each memory module address k also specifies a different coordinate y, which is proportional to the distance $d_{+y}$ from the observer along the minor diagonal.

The case where each k along the minor diagonal specifying a different z coordinate, will be considered using a procedure similar to that employed hereinbefore, the depth measure $d_{+z}$ is obtained as:

$$d_{+z}=z=(-172(k-5x-2(y-z))) \bmod 517$$

for $n=517$, $a=5$, $b=2$, and $c=1$, and $T(517/3)=-172$. The depth measured $d_{+y}$ is similarly obtained as:

$$d_{+y}=y=(-172(k-5x+(y-z))) \bmod 517.$$

For the general case of voxel beam retrieval along storage/retrieval direction No. +5, where the generalized linear skewing function is employed in the storage mapping operation, the derived congruence $$k=(ax+by-bz+(c+b)z) \bmod n$$

can be manipulated to provide $$(c+b)z=(k-(ax+b(y-z))) \bmod n,$$

from which the voxel depth measure $d_{+z}$ can be derived using moduli algebra, as follows:

$$d_{+z}=z=\left(T\left(\frac{n}{c+b}\right)(k-ax-b(y-z))\right) \bmod n$$

Alternatively, for the second option discussed above, $d_{+y}$ is provided by:

$$d_{+y}=y=\left(T\left(\frac{n}{b+c}\right)(k-ax+c(y-z))\right) \bmod n$$

Accessing a beam of voxels along the minor diagonal specified by storage/retrieval direction No. +6 in the 3-D matrix array will now be considered. As illustrated in FIG. 5B, each such minor diagonal is defined by equation x−z=constant, and coordinate y=y$_o$. The fact that x-y equals a constant, provides two options for determining the depth along the beam. According to the first option, along this storage retrieval direction, each memory module address k specifies a different coordinate z which is proportional to the distance d$_{+z}$ from the observer along this minor diagonal. Alternatively, each memory module address k also specifies a different coordinate x which is proportional to the distance d$_{+x}$ from the observer along the minor diagonal.

The case where each k along the minor diagonal specifying a different z coordinate, will be considered. Using a procedure similar to that employed hereinbefore, the depth measure d$_{+z}$ is obtained as:

$$d_{+z}=z=(T(n/c)(k-ax-by)) \bmod n$$

Similarly, d$_{+x}$=x=(−86 (k−2y−(x−z))) mod n.

For the general case of voxel beam retrieval along the storage/direction No. +6, where the generalized linear skewing function is employed in the storage mapping operation, the dervied consequence $$k=(ax-az+by+(c+a)z) \bmod n$$

can be manipulated to provide $$(c+a)z=(k-(a(x-z)+by)) \bmod n,$$

from which the voxel depth measure d$_{+z}$ can be derived using modular arithmetic, as follows:

$$d_{+z} = z = T\left(\frac{n}{c+a}\right)(k - a(x-z) - by)) \bmod n$$

Alternatively, for the second option discussed above, d$_{+x}$ is provided by:

$$d_{+x} = \left(T\left(\frac{m}{a+c}\right)(k - by + c(x-z))\right) \bmod n.$$

Accessing a beam, of voxels along the minor anti-diagonal specified by storage/retrieval direction No. +7 in the 3-D matrix array, will now be considered. As illustrated in FIG. 5B, each such minor anti-diagonal is defined by the equation x y=constant, and coordinate z=z$_o$. The fact that x+y equals a constant provides two options for determining the depth along the beam. According to the first option, along this storage/retrieval direction, each memory module address along the minor anti-diagonal specifies a different coordinate x which is proportional to the distance (i.e. depth) d$_{+x}$ from the observer along this minor anti-diagonal. Alternatively, each memory module address k also specifies a different coordinate y which is proportional to the distance d$_{+y}$ from the observer along the minor anti-diagonal.

The case where each k along the minor anti-diagonal specifying a different x coordinate, will be considered. Using a procedure similar to that employed hereinbefore, the voxel depth measure d$_{+x}$ is obtained as:

$$d_{+x}=x=(-172(k-(2(x+y)+z))) \bmod 517.$$

For the general case of voxel beam retrieval along storage/retrieval direction No. +7, where the generalized linear skewing function is employed in the storage mapping operation, the derived congruence $$k=(ax+ay+(b-a)y+cz) \bmod n$$

can be manipulated to provide $$(b-a)y=(k-(a(x+y)+cz)) \bmod n,$$

from which the voxel depth measure d$_{+y}$ can be derived using moduli algebra, as follows:

$$d_{+y} = y = \left(T\left(\frac{n}{b-a}\right)(k - a(x+y) - cz)\right) \bmod n.$$

Alternatively, for the second option discussed above, d$_{+x}$ is provided by:

$$d_{+x} = x = \left(T\left(\frac{n}{a-b}\right)(k - b(x+y) - cz)\right) \bmod n$$

Accessing a beam of voxels along the minor anti-diagonal specified by storage/retrieval direction No. +8 in the 3-D matrix array, will now be considered. As illustrated in FIG. 5B, each such minor anti-diagonal is defined by equation y+z =constant, and coordinate x=x$_o$. The fact that y+z equals a constant, provides two options for determining the depth along the beam. According to the first option, each memory module address k along the minor anti-diagonal specifies a different coordinate value x, which is proportional to the distance d$_{+x}$ from the observer along this minor anti-diagonal. Alternatively, each memory module address k also specifies a different coordinate y which is proportional to the distance d+y from the observer along the minor anti-diagonal.

The case where each k along the minor anti-diagonal specifying a different z coordinate, will be considered. Using a procedure similar to that employed thereinbefore, the voxel depth measure d$_{+z}$ is obtained as:

$$d_{+z}=z=(5x+2(y+z)-k) \bmod 517$$

For the general case of voxel beam retrieval along storage/retrieval direction No. +8, where the generalized linear skewing function is employed in the storage mapping operation, the derived congruence $$k=(ax+by+bz+(c-b)z)) \bmod n$$

can be manipulated to provide $$(c-b)z=(k-ax-b(y+z)) \bmod n$$

from which the voxel depth measure d$_{+z}$ can be derived using moduli algebra, as follows:

$$d_{+z} = z = \left(T\left(\frac{n}{c-b}\right)(k - ax - b(y+z))\right) \bmod n$$

Alternatively, for the second option discussed above, d$_{+y}$ is provided by:

$$d_{+y} = y = \left(T\frac{m}{(b-c)}(k - c(y+z) - ax)\right) \bmod n$$

Assessing a beam of voxels along a minor anti-diagonal specified by storage/retrieval direction No. +9 in the 3-D matrix array, will now be considered. As illustrated in FIG. 5B, each such minor anti-diagonal is defined by the equation $x=z=$constant, and coordinate $y=y_0$. The fact that $x+z$ equals a constant provides two options for determining the depth along the beam. According to the first option, along this storage/retrieval direction, each memory module address along the minor anti-diagonal specifies a different coordinate x which is proportional to the distance (i.e. depth) $d_{+x}$ from the observer along this minor anti-diagonal. Alternatively, each memory module address k also specifies a different coordinate z which is proportional to the distance $d_{+z}$ from the observer along the minor anti-diagonal.

The case where each k along the minor anti-diagonal specifying a different x coordinate, will be considered. Using a procedure similar to that employed hereinbefore, the voxel depth measure $d_{+x}$ is obtained as:

$$d+x = x = (129(k-2y-(x+z))) \bmod 517$$

For the general case of voxel beam retrieval along storage/retrieval direction No. +9, where the generalized linear skewing function is employed in the storage mapping operation, the derived congruence $$k=(ax+az+by+(c-a)z) \bmod n$$

can be manipulated to provide $$(c-a)z=(k-(a(x+z)+by)) \bmod n$$

from which the voxel depth measure $d_{+z}$ can be derived by using moduli algebra, as follows:

$$d_{+z} = z = \left(T\frac{m}{(c-a)}(k - a(x+z) - by)\right) \bmod n$$

Alternatively, for the second option discussed above, $d_{+x}$ is provided by:

$$d_{+x} = x = \left(T\frac{m}{(a-c)}(k - c(x+z) + by)\right) \bmod n$$

Accessing a beam of voxels along a major diagonal specified by storage retrieval direction No. +10 in the 3-D matrix array, will now be considered. As illustrated in FIG. 5B, each such major diagonal is defined by the equations $x-y=$constant, $y-z=$constant and $x-z=$constant, (each one of these equations can be derived from the other two). These equals provide three options for determining the "depth measure" along the beam. According to the first option, each memory module address along the major diagonal specifies a different coordinate x which is proportional to the distance (i.e., depth measure) $d_{+x}$ from the observer along the major diagonal.

Alternatively, each memory module k also specifies a different coordinate y which is proportional to the distance measure $d_{+y}$ from the observer along the major diagonal. In the third option, each memory module k specifies a different coordinate z which is proportional to the distance measure $d_{+z}$ from the observer along the major diagonal.

The case where each k along the major diagonal specifying a different x coordinate will be considered. Using a procedure similar to that employed hereinbefore, the voxel depth measure $d_{+x}$ is obtained as:

$$d_{+x}=x=(194(k+(y-z)+3(x-y))) \bmod 517$$

For the general case of voxel beam retrieval along storage/retrieval direction No. +10, where the generalized linear skewing function is employed in the storage mapping operation, the derived congruence $$k=(ax-ay+(b+a)y-(b+a)z+(c+b+a)z) \bmod n$$

can be manipulated to provide $$(a+b+c)z=(k-(a(x-y)+(b+a)(y-z))) \bmod n$$

from which the voxel depth measure $d_{+z}$ can be derived using modular arithmetic, as follows:

$$d_{+z} = z = \left(T\frac{n}{(a+b+c)}(k - a(x-y) - (a+b)(y-z))\right) \bmod n$$

Alternatively, for the second option discussed above, $d_{+x}$ is provided by:

$$d_{+x} = x = \left(T\frac{n}{(a+b+c)}(k - b(y-z) + (a+b)(x-z))\right) \bmod n$$

Alternatively, for the third option discussed above, $$d_{+y} = y = \left(T\frac{n}{(a+b+c)}(k - a(x-z) + (a+c)(y-z))\right) \bmod n$$

Accessing a beam of voxels along a major anti-diagonal specified by storage/retrieval direction No. +11 in the 3-D matrix array, will now be considered. As illustrated in FIG. 5B, each such major anti-diagonal is defined by the equations $x+y=$constant, $y+z=$constant and $x-z=$constant, (each one of these equations can be derived from the other two). These equals provide three options for determining the "depth measure" along the beam. According to the first option, each memory module address along the major diagonal specifies a different coordinate x which is proportional to the distance (i.e. depth measure) $d_{+x}$ from the observer along the major diagonal.

Alternatively, each memory module k also specifies a different coordinate y which is proportional to the distance measure $d_{+y}$ from the observer along the major diagonal. In the third option, each memory module k specifies a different coordinate z which is proportional to the distance measure $d_{+z}$ from the observer along the major diagonal.

The case where each k along the major diagonal specifying a different x coordinate will be considered. Using a procedure similar to that employed hereinbefore, the voxel depth measure $d_{+x}$ is obtained as:

$$d_{+x}=x=(129(k-2(y+z)-(x-z)))\ mod\ 517$$

For the general case of voxel beam retrieval along storage/retrieval direction No. +11, where the generalized linear skewing function is employed in the storage mapping operation, the derived congruence $$k=(ax+ay+(b-a)y-(b-a)z+(c-b+a)z)\ mod\ n$$

can be manipulated to provide $$(a-b+c)z=(k-(a(x+y)+(b-a)(y+z)))\ mod\ n$$

from which the voxel depth measure $d_{+z}$ can be derived using modular arithmetic, as follows:

$$d_{+z} = z = \left(T\frac{n}{(a-b+c)}(k-a(x+y)-(b-a)(y+z))\right) mod\ n$$

Alternatively, for the second option discussed above, $d_{+y}$ is provided by:

$$d_{+x} = x = \left(T\frac{n}{(a-b+c)}(k-b(y+z)+(c-b)(x-z))\right) mod\ n$$

Alternatively, for the third option discussed above, $d_{+y}$ is provided by:

$$d_{+y} = y = \left(T\frac{n}{(a+b+c)}(-k+a(x-z)+(a+c)(y+z))\right) mod\ n$$

Accessing a beam of voxels along a major anti-diagonal specified by storage/retrieval direction No. +12 in the 3-D matrix array, will now be considered. As illustrated in FIG. 5B, each such major anti-diagonal is defined by the equations x−y=constant, y+z=constant and x+z=constant, (each one of these equations can be derived from the other two). These equals provide three options for determining the "depth measure" along the beam. According to the first option, each memory module address along the major diagonal specifies a different coordinate x which is proportional to the distance (i.e. depth measure) $d_{+x}$ from the observer along the major diagonal.

Alternatively, each memory module k also specifies a different coordinate y which is proportional to the distance measure $d_{+y}$ from the observer along the major diagonal. In the third option, each memory module k specifies a different coordinate z which is proportional to the distance measure $d_{+z}$ from the observer along the major diagonal.

The case where each k along the major diagonal specifying a different x coordinate will be considered. Using a procedure similar to that employed hereinbefore, the voxel depth measure $d_{+x}$ is obtained as:

$$d_{+x}=x=(-86\ (k-2(y+z)+(x+z)))\ mod\ 517$$

For the general case of voxel beam retrieval along storage/retrieval direction No. +12, where the generalized linear skewing function is employed in the storage mapping operation, the derived congruence $$k=(ax+az+(c-a)z+(c-a)y+(b-c+a)y)\ mod\ n$$

can be manipulated to provide $$(a+b-c)y=(k-(a(x+z)+(c-a)(y+z)))\ mod\ n$$

from which the voxel depth measure $d_{+y}$ can be derived using modular arithmetic, as follows:

$$d_{+y} = y = \left(T\frac{n}{(-a+b-c)}(k-a(x+z)-(c-a)(y+z))\right) mod\ n$$

Alternatively, for the second option discussed above, $d_{+x}$ is provided by:

$$d_{+x} = x = \left(T\frac{n}{(-a+b-c)}(-k+b(y+z)-(b+c)(x+z))\right) mod\ n$$

Alternatively, for the third option discussed above, $d_{+z}$ is provided by:

$$d_{+z} = z = \left(T\frac{n}{(a+b-c)}(-k+a(x-y)-(a+b)(y+z))\right) mod\ n$$

Accessing a beam of voxels along a major anti-diagonal specified by storage/retrieval direction No. +13 in the 3-D matrix array, will now be considered. As illustrated in FIG. 5B, each such major anti-diagonal is defined by the equations x+y=constant, y−z=constant and x+z=constant, (each one of these equations can be derived from the other two). These equals provide three options for determining the "depth measure" along the beam. According to the first option, each memory module address along the major diagonal specifies a different coordinate x which is proportional to the distance (i.e. depth measure) $d_{+x}$ from the observer along the major diagonal.

Alternatively, each memory module k also specifies a different coordinate y which is proportional to the distance measure $d_{+y}$ from the observer along the major diagonal. In the third option, each memory module k specifies a different coordinate z which is proportional to the distance measure $d_{+z}$ from the observer along the major diagonal.

The case where each k along the major diagonal specifying a different x coordinate will be considered. Using a procedure similar to that employed hereinbefore, the voxel depth measure $d_{+x}$ is obtained as:

$$d_{+x}=x=(-258(k-2(y-z)-3(x+z)))\ mod\ 517$$

For the general case of voxel beam retrieval along storage/retrieval direction No. +13, where the generalized linear skewing function is employed in the storage mapping operation, the derived congruence $$k = (bx + by + (a-b)x + (a-b)z + (c-a+b)z) \bmod n$$

can be manipulated to provide $$(-a+b+c)y = (k - (b(x+y) + (a-b)(x+z))) \bmod n$$

from which the voxel depth measure $d_{+z}$ can be derived using modular arithmetic, as follows:

$$d_{+z} = z = \left( T \frac{n}{(-a+b+c)} (k - b(x+z) - (a-b)(x+z)) \right) \bmod n$$

Alternatively, for the second option discussed above, $d_{+x}$ is provided by:

$$d_{+x} = x = \left( T \frac{n}{(-a+b+c)} (-k + b(y-z) - (b+c)(x+z)) \right) \bmod n$$

Alternatively, for the third option discussed above, $d_{+y}$ is provided by:

$$d_{+z} = y = \left( T \frac{n}{(-a+b+c)} (k - a(x+z) - (a-c)(y-z)) \right) \bmod n$$

While only the cases of six and twenty six conflict-free storage/retrieval directions have been hereindescribed, it is within the full understanding of the present invention to provide methods of an apparatus for storing and retrieving voxels along more than twenty-six storage/retrieval directions, utilizing the principles of the present invention. In particular, more than twenty-six storage/retrieval directions are obtainable with the present invention, and such directions can be either "conflict-free" single access, or involve multiple but a limited number of conflict-free accesses to the Cubic Frame Buffer in 3-D discrete voxel space $Z^3$.

Referring now to FIGS. 7 through 13, the apparatus of the present invention, will now be described. Notably, however, such apparatus while capable of carrying out the methods of the present invention, can nevertheless be used to perform other more general voxel-based and general computer data storage, accessing and processing operations.

Figure 7:
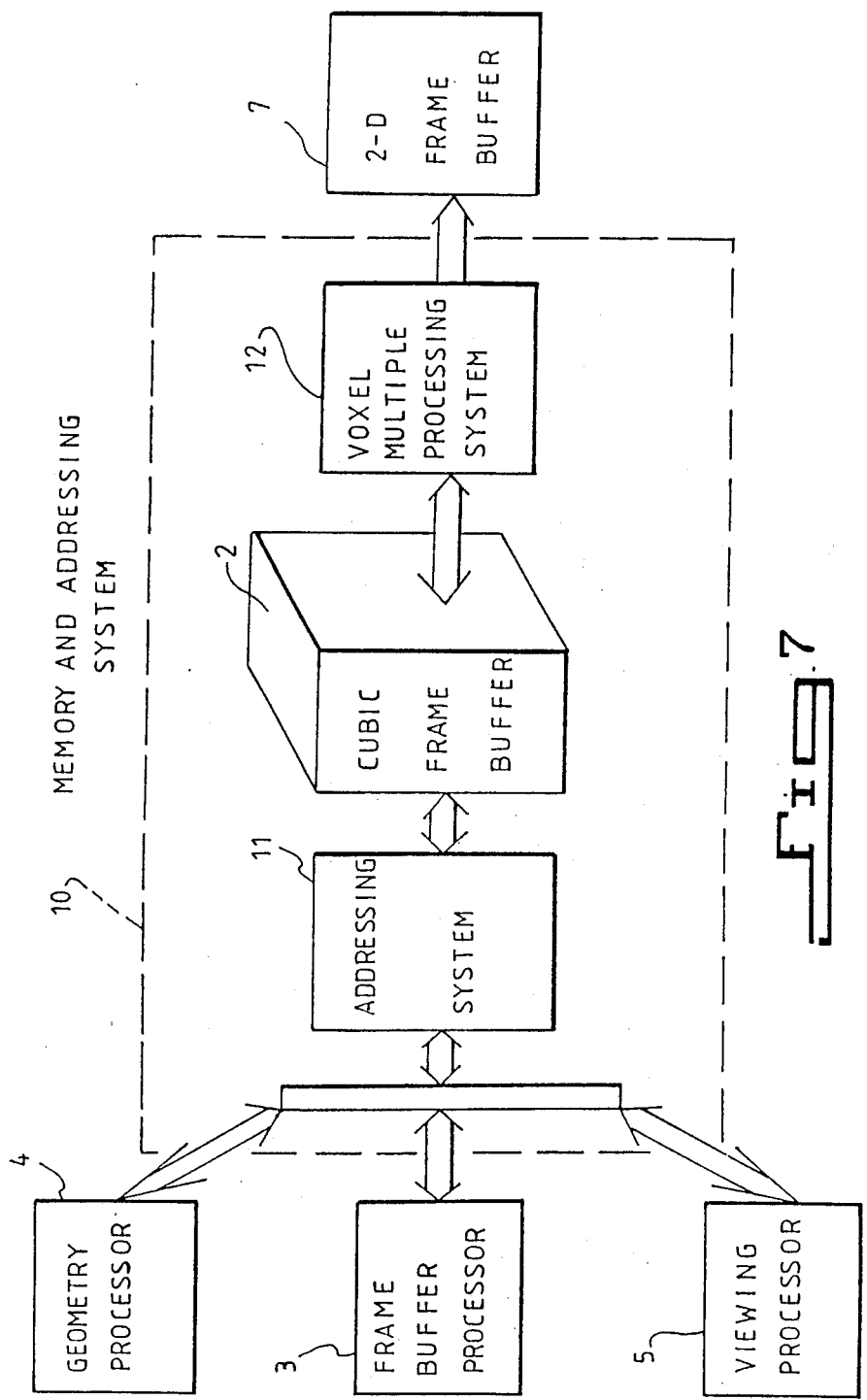
FIG. 7 is a block system diagram of the 3-D voxel-based workstation constructed in accordance with the principles of the present invention.

In FIG. 7, the voxel-based graphics system of the preferred embodiment, is graphically represented as comprising three processors, namely a Geometry Processor 4, a Frame Buffer Processor 3 and a Viewing Processor 5, a memory and addressing system, and a 2-D Frame Buffer 7. In general, the memory and addressing system 10 includes an addressing system 11, a Cubic Frame Buffer, and a voxel multiple write processing system 12.

In FIG. 8, the voxel-based graphics system of FIG. 7 is schematically illustrated, with the elements of the memory and addressing system 10 shown in greater detail. Specifically, the memory and addressing system 10 has an overall modular structure comprising a plurality of similar modules 13 indexed $k=0, 1 \ldots n-1$, each central addressing unit 14, and several shared buses to be described hereinafter in greater detail.

In the preferred embodiment, each k-th module 13 includes a k-th local address unit 15, a k-th memory module 16, and voxel multiple write processing unit 17. Each k-th memory module is independently accessible (i.e. addressible) by the central addressing unit 14, as well as in cooperation with the corresponding k-th local addressing unit 15.

In the preferred embodiment, each k-th memory module contains a plurality of internal memory cells, each indexed (or addressed) by internal memory cell indices (or addresses) i and j, where $0 \leq i \leq n-1$ and $0 \leq j \leq n-1$. Notably however, such a two-dimensional type memory unit is not necessary to carry out the method hereof, but could be realized using a linear type memory array specified by a single index h ranging from $0 \leq h \leq (h-1)^2$ for an $n^3$-voxel Cubic Frame Buffer.

In order to write in, and read out, voxel-based data with the plurality of n memory modules, a voxel data bus 18 is provided and can be realized in several ways known to those skilled in the art. In addition, an inter-module voxel-data movement (i.e. shifting or skipping) mechanism 19 is also provided, being more fully illustrated in FIG. 12. Through each of the plurality of voxel-multiple write processing units 17, the operation and function of which will be described in detail hereinafter.

Referring now to FIG. 9, there is graphically represented in detail, the internal elements of a single k-th module of the modular-structured memory and addressing unit illustrated in FIG. 8. Also shown in FIG. 9, is the central addressing unit 14 which, in the preferred embodiment hereof, provides in a global manner, broadcasted addresses k", i", and j" to each of the local addressing units of the n modules by way of a common bus for the purpose of transmitting (i.e. "broadcasting") those addresses k", i", j" to the local addressing units, in a manner to be described more fully hereinafter.

Also shown in FIG. 9, are interval and depth control parameters, e.g., $d_1$ and $d_2$, which are broadcasted to each of the local addressing units of the n modules, preferably over a common bus. In addition, voxel beam write/read/view control parameters are similarly "broadcasted" over a common bus, to each of the k-th local addressing units.

In each k-th module, the local addressing unit 15 includes several elements; namely: a local voxel depth measure (i.e. metric) computation unit 20 for computing the voxel depth measure of the k-th voxel in a beam; a k-th module index (i.e. identity) storage unit 21; a k-th broadcasted address/module identity comparator unit 22 comparing the k" broadcast address with the k-th module index and generating a control enable; and comparator unit 23 for comparing the "broadcasted" interval and depth control parameters $d_1$ and $d_2$, with the locally-computed voxel depth measure of the k-th voxel, and generating a control enable as well, to be provided to the k-th memory module.

Each k-th local addressing unit 15, is provided with a logical "OR" device 24, the inputs of which are the outputs of the comparator units 22 and 23. Depending on the mode of memory access of the memory and addressing system 10 (i.e. whether a single voxel or beam of voxels is to be read, written, or viewed), one or more than one logical "OR" device provides control enable signals to its corresponding memory module. For example, when only a single k-th voxel is to be read or written, then only the k-th memory module will be enabled, the k-th enabled memory module being the module where the broadcasted index k" equals the k-th module index (or identity). On the other hand, when a beam of voxels is to be read, written or viewed, then all of the memory modules will be enabled, where the enabled memory modules are those which fall within the "interval" specified by the "broadcasted" interval control parameters $d_1$ and $d_2$. In either mode of memory access, the enabled memory module is enabled to read or write voxel(s) on the voxel data bus.

Each local addressing unit 15 also includes a switching means for passing either (i) the broadcasted addresses i" and j", (ii) the addresses equated to the voxel depth measure d locally computed by local voxel depth computation units, or (iii) combination thereof as will be explained further hereinafter. In the preferred embodiment shown in FIG. 9, the switching means is realized using a pair of multiplexers 25 and 26, the controls of which are not shown. Notably however, the controls to these multiplexers 25 and 26 are specified, preferably, by "voxel beam direction" specifications selected by the observer-/user on the basis of "spatial parameters" such as $\pm x$, $\pm y$, and $\pm z$, to be described in greater detail hereinafter.

It is appropriate at this juncture, to point out that during voxel reading and writing modes of operation, the memory module and local address units of each module may participate in carrying out the specified operation, and that, in general, although subject to some exceptions, the voxel multiple write processing system is inactive. One exception is during intermodule voxel-data movement, carried out by the intermodule voxel-data movement mechanism. There, the voxel-multiple write processing system is enabled to assist in performing the necessary operations of such an intermodule voxel-data permutation scheme, which will be described in greater detail hereinafter.

During the viewing mode of the memory and addressing system 10, the voxel multiple write processing system 12 is an active participant in such a projection-based process.

Figure 9A:
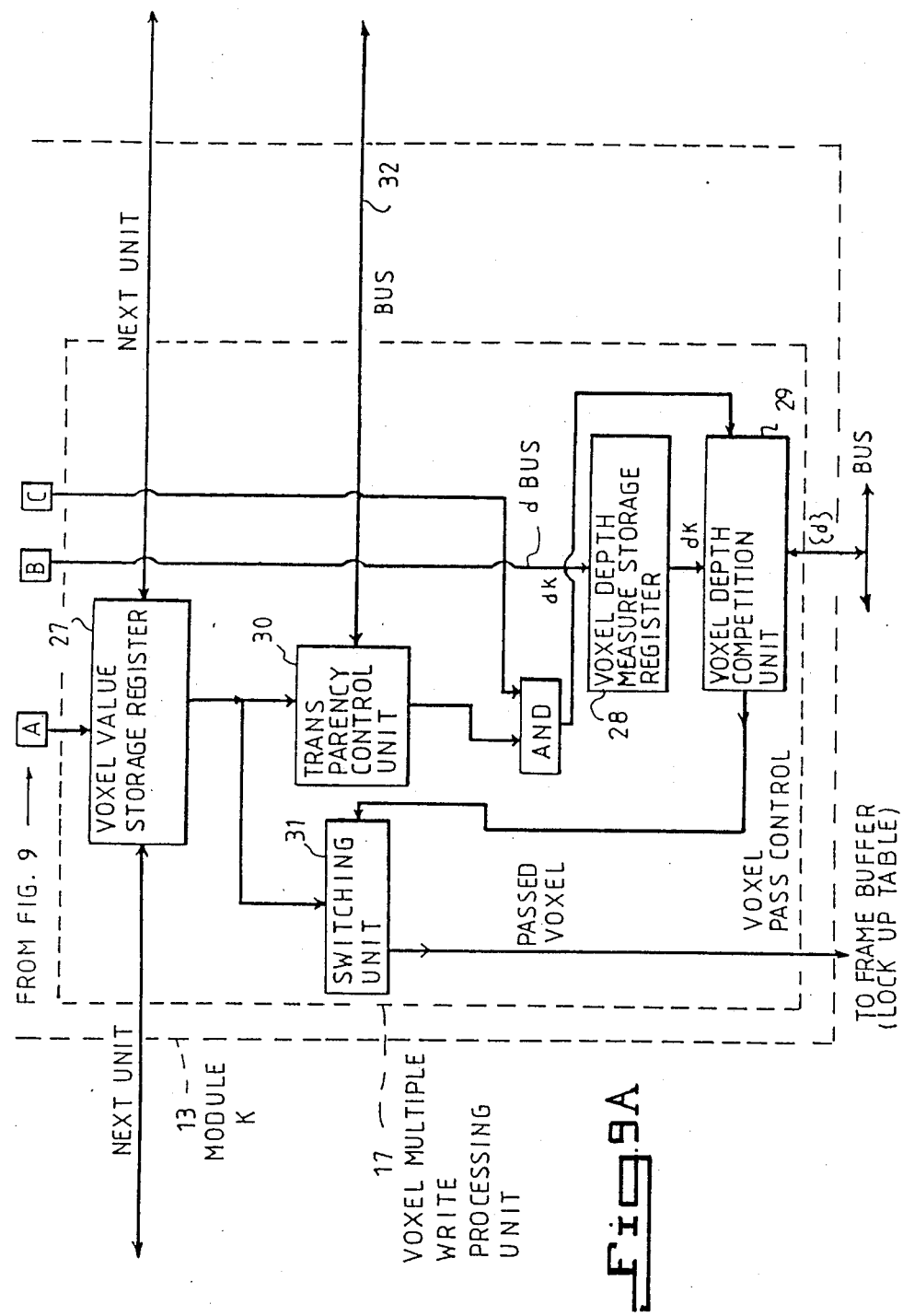
FIG. 9A is a continuation of the block schematic diagram shown in FIG. 9.
Figure 10:
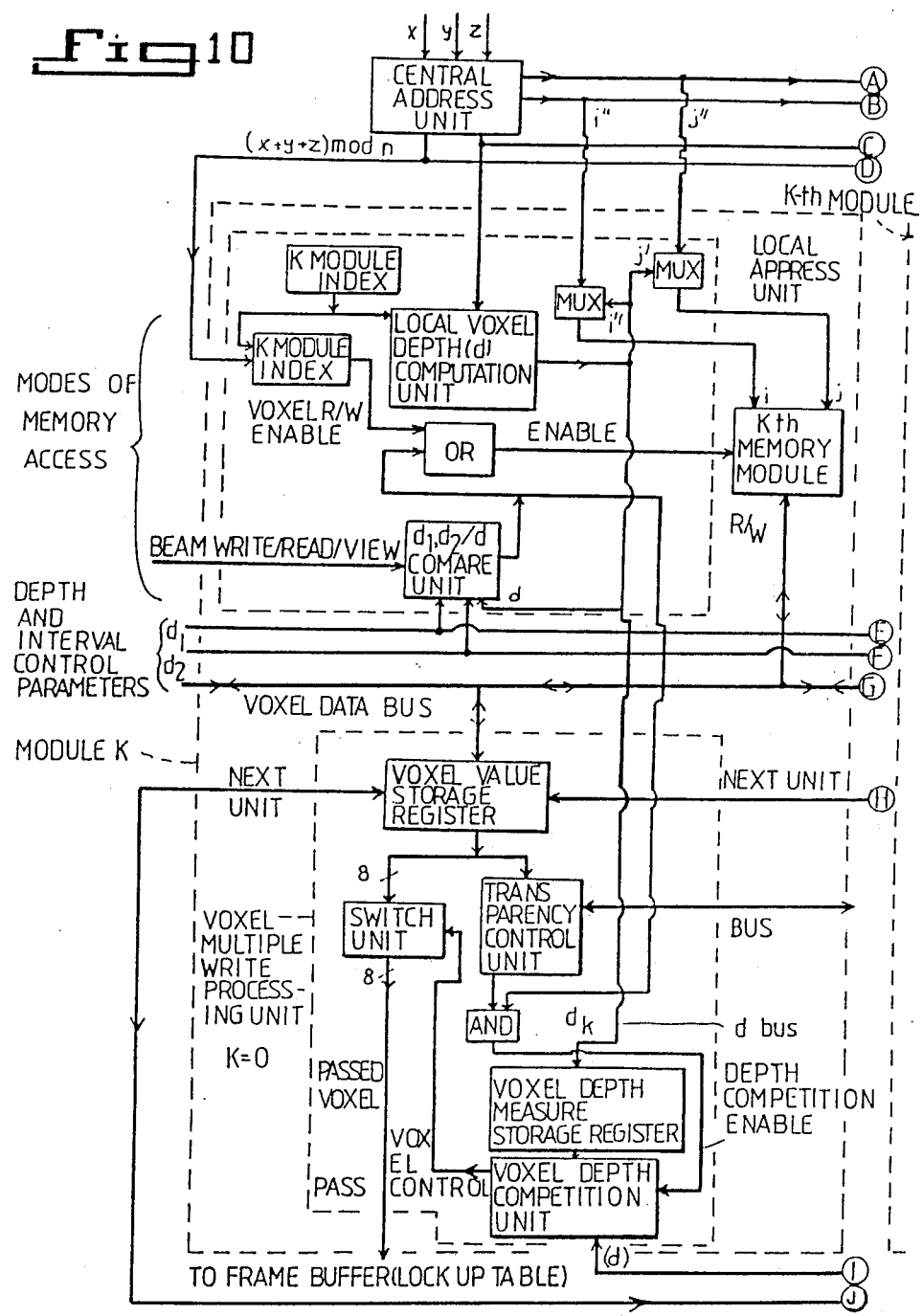
FIG. 10 is a block schematic diagram of the memory and addressing system of the present invention illustrated in FIG. 9, showing the central addressing unit and several modules.
Figure 10A:
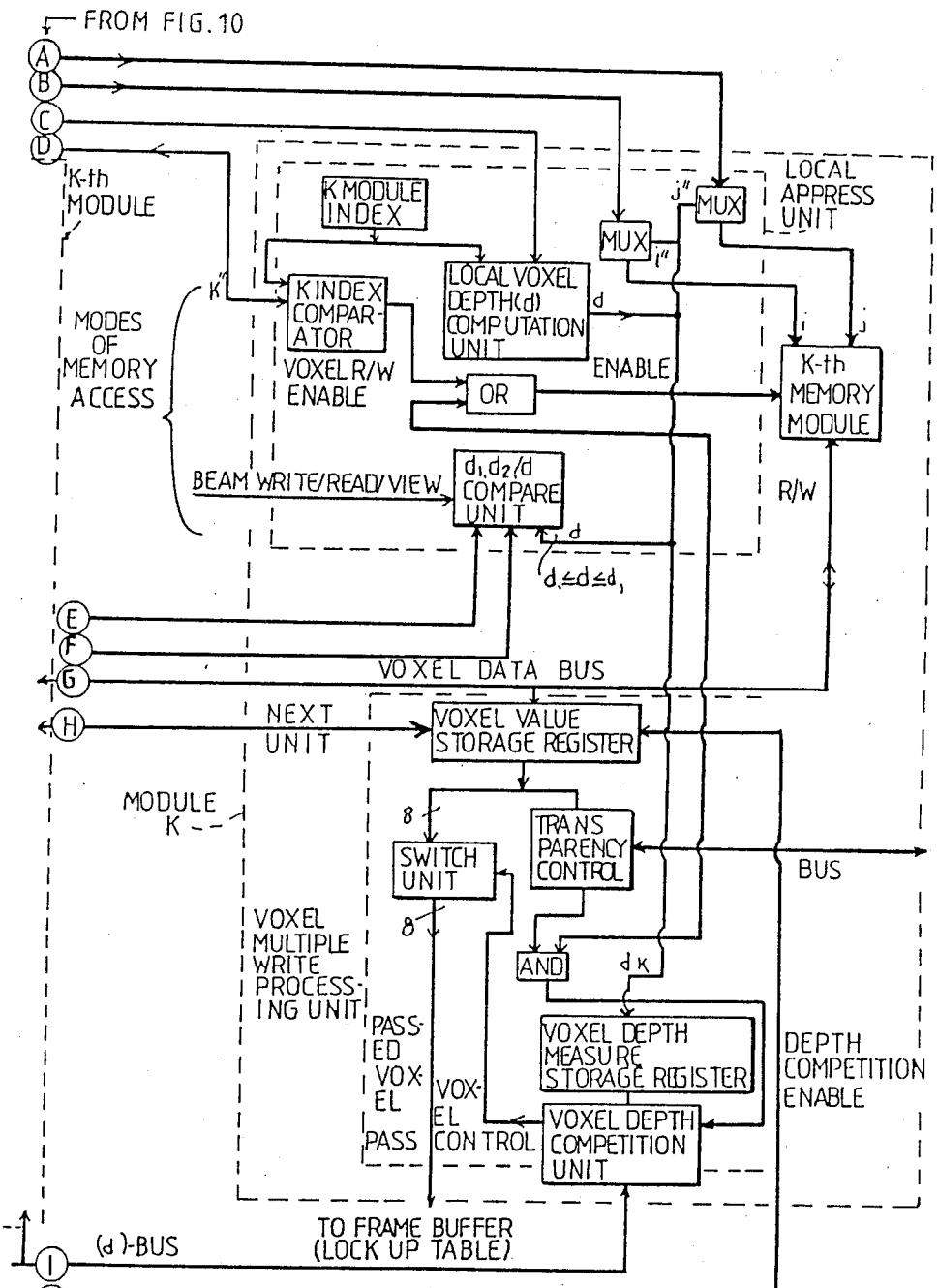
FIG. 10A is a continuation of the block schematic diagram of FIG. 10.
Figure 11:
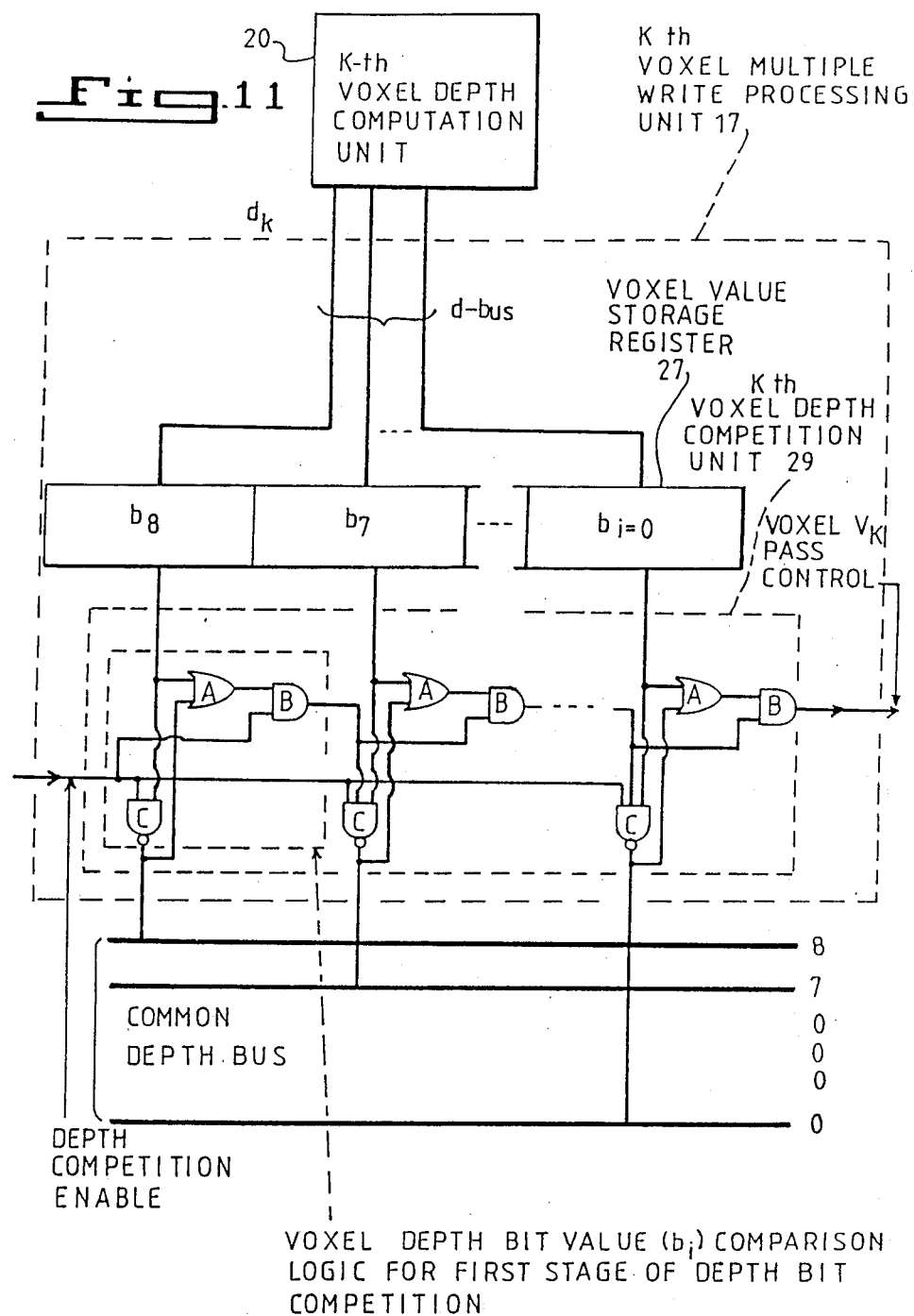
FIG. 11 is a schematic representation of a portion of the voxel multiple write processing unit, showing the configuration of the k-th voxel depth computation unit of the local address unit, with the voxel depth measure storage register, the k-th local voxel depth competition unit, and the voxel depth bus of the present invention.

Referring to FIG. 9A, each k-th voxel multiple write processing unit 17 includes in the preferred embodiment, a voxel value storage register 27, a voxel depth measure storage register 28, a local voxel depth competition unit 29, a transparency control unit 30, a switching unit 31, and a logical "AND" device.

Each k-th voxel value storage register 27, is interconnected with each of its adjacent neighboring voxel value storage registers by way of a voxel-data transfer path.

Figure 12:
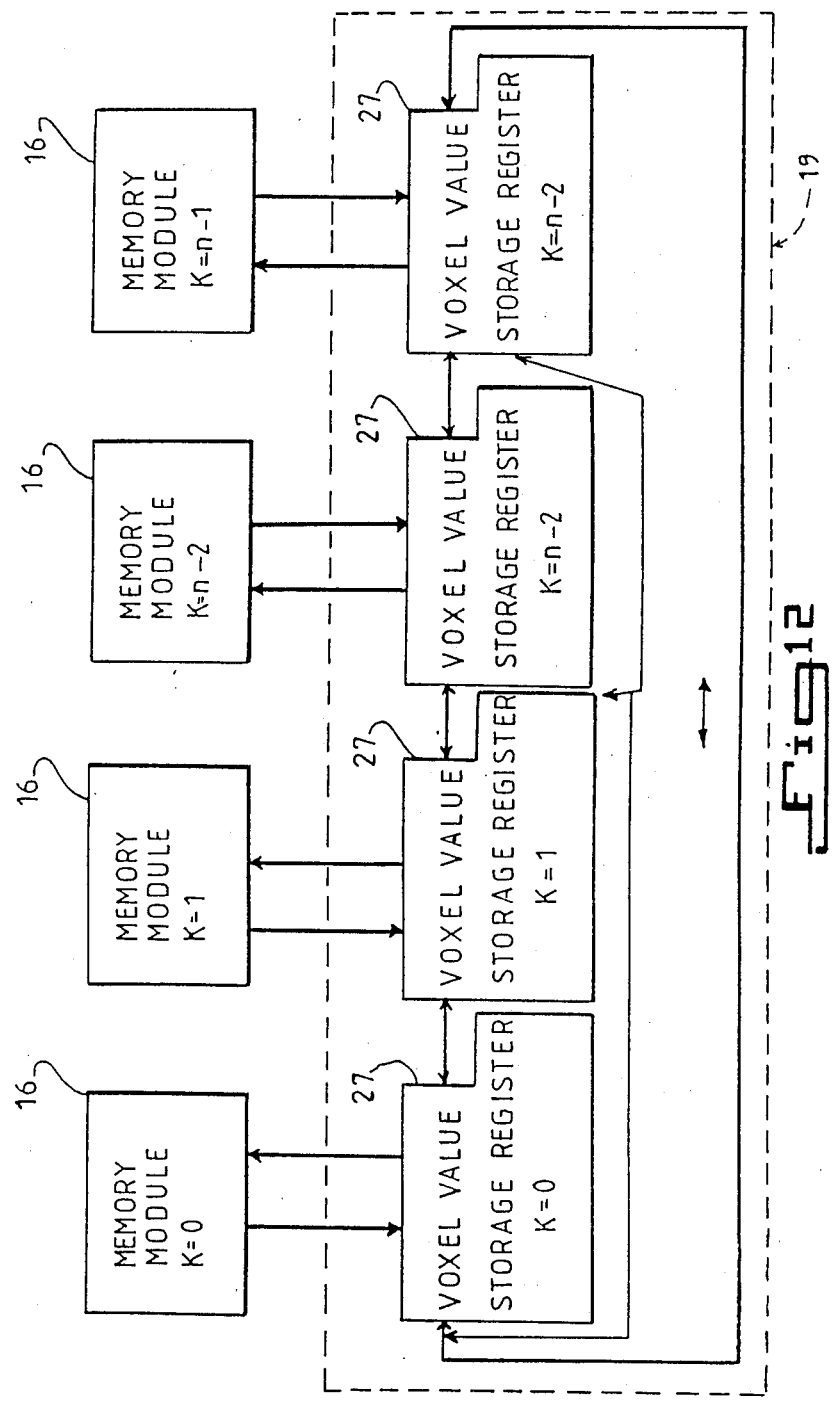
FIG. 12 is a graphical representation of the inter-module voxel value moving (i.e. shifting) mechanism of the present invention.

As illustrated in FIG. 12, the intermodule connections amongst the voxel storage registers can "skip" one or more voxel storage registers along the voxel data transfer path. Such "skips" could be realized for example, by hardwired connections.

The output of each k-th voxel value storage register 27 is provided to two input ports of two elements, namely, the transparency control unit 30 and the switching unit 31.

In addition, each k-th transparency control unit 30 is provided with transparency control parameters transmitted (i.e., "broadcasted") to all transparency control units, over a common bus 32. The nature of these transparency control parameters can be of a wide variety, as can be the voxel value themselves. For example, when using an 8-bit voxel representation, the voxel value can represent different colors. Thus, within this range of colors, any set of such colors can be defined as "transparent", or opaque (i.e., non-transparent). It is the function of the transparency control parameter, then to define which colors or combinations of colors are to be announced as "transparent" or "opaque". Notably, however, voxel values can represent physical or other properties of objects and scenes, other than color. For example, texture, material density and translucency ratios, of a small unit cube in the real scenes are important.

In order to carry out the projection method wherein the voxel (in a beam along in a conflict force storage retrieval direction) closest to an observer is determined, the method of the present invention involves the following procedure. For each voxel in a beam, the voxel depth measured along a specified storage/retrieval direction, is placed in its respective voxel depth measure storage register 28. Then each k-th transparency control unit determines whether the voxel value in its corresponding voxel value storage register is, by definition of the broadcasted transparency parameter, opaque. In addition, if the voxel depth measure of the voxel in the corresponding voxel value storage register is determined to be within the range of depth control (i.e., in the "unclipped" range) specified by d, and $d_2$, then a depth control enable is provided to the input of the logical "AND" device. If the voxel value in the k-th voxel value storage register is both "opaque" and within the depth interval specified by d, and $d_2$ control parameters, then the AND device generates an depth competition enable signal to the k-th corresponding voxel depth competition unit, thereby allowing it to conduct a local "depth value competition process" to be described below. Notably, however, the "AND" device can be substituted with an "OR" device or eliminated altogether thus allowing local depth competition processes in each of the three n modules, regardless of transparency and depth interval parameters. This might be useful on reading/writing operations. Notably, this "winning" voxel value represent the "opaque" voxel value which is closest to the observer viewing along the voxel beam parallel to the user-specified storage/retrieval direction. In addition, this process provides great flexibility in defining which voxel values are opaque, and thus are allowed to compete locally within, optionally, prior to passage into the 2-D frame buffer, the voxel value can be processed "on the fly" within a suitable shading unit.

Returning now to FIG. 11, the internal elements of each voxel multiple write processing unit 17 of the preferred embodiment, is illustrated in greater detail.

As illustrated, the k-th local voxel depth computation unit 20 provides to the k-th voxel depth measure storage register 28, the computed depth measure $d_k$, which as shown, is represented by a plurality of (e.g. nine) binary bits, $b_8, b_7 \ldots b_i \ldots b_0$, for the case of n=512. The depth measure storage register 28 comprises a plurality of storage cells, each cell containing a $b_i$ bit which is provided to a different stage of the k-th voxel depth competition unit 29. Each i-th stage in the voxel depth competition unit comprises conventional logic circuitry (e.g., logic elements A, B, and C) which in effect compares the $b_i$ bit with the corresponding $b_i$ bits of all other voxel depth measures provided to the k-th depth competition unit by way of the common depth bus, as described hereinbefore.

The operation of the voxel depth competition unit 29 is as follows. With the (i=8)th stage of each "enabled" voxel depth competition unit being active while all other stages are inactive, the most significant binary bit digit of each voxel depth measure is compared using the logic circuitry of that stage, and the group of voxels having the predetermined extreme value (e.g., largest value) are determined. For each $b_i$ bit (in each depth competition unit 29) which was determined to have the predetermined extreme value, the next stage of these depth competition units are enabled for a comparison of the next most significant bit value. The above comparison, determining and group formation steps are repeated for successive stages of the voxel depth competition unit 29, on the basis of consecutive significant binary digits, until only one surviving voxel depth measure remains in the group. The voxel depth competition unit 29 corresponding to the surviving voxel, generates a voxel pass control provided to the switch unit 31 to allow that voxel in the corresponding voxel value storage register, to be passed into 2-D frame buffer, (FB) 7, as described hereinbefore. The surviving voxel depth measure corresponds to the voxel which is closest to the viewing along the specified storage/retrieval direction.

Returning to FIG. 13 in particular, an addition schematic representation is shown, illustrating only those portions of central addressing unit, local address units, and memory modules which function in the memory storage mapping and demapping operations of the present invention. As discussed hereinbefore, pairs of coordinate values sums and differences are required to compute the local addresses using the demapping functions as discussed hereinbefore. However, since such coordinate value sum and differences are required by each local voxel depth computation unit, they are in the preferred embodiment, computed by the central addressing unit 14 and "broadcasted" to all local addressing units over a common bus 32.

Figure 13:
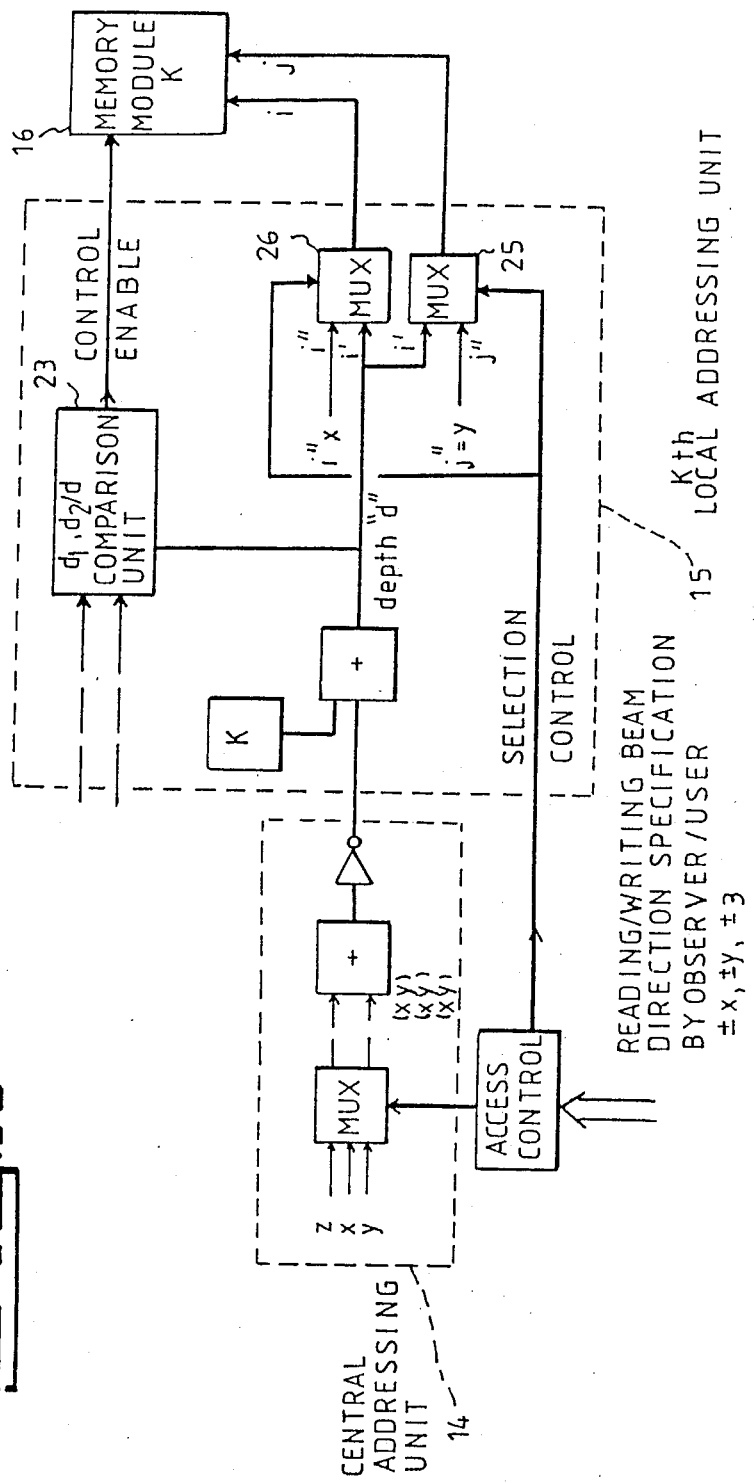
FIG. 13 is a block schematic diagram of the central addressing unit, the k-th local addressing unit, and k-th memory module of the apparatus for storing, accessing and processing voxel-based data according to principles of the present invention.

As illustrated in FIG. 13., the demapping functions (i.e., voxel depth measure formulas) can be realized using multipliers, adders, subtractors and switches. For the case of six viewing directions, a depth measure function is realized in FIG. 13, partly by the central addressing unit 14 and partly by the k-the local addressing unit 15. However, modifications of such realizations are expected to occur.

In addition while not shown in FIG. 13, the binary skewing function $S(x, y, z)$ for the case of six conflict-free storage/retrieval directions, could typically be realized in the central processing unit 14 using again, devices to carry out multiplication, addition, subtraction and other arithmetic functions, and thereafter be "broadcasted" to all in local addresses, over a common addressing bus 32.

While the particular embodiments shown and discussed hereinabove have proven to be useful in many applications, further modifications of the present invention hereindisclosed will occur to persons skilled in the art to which the present invention pertains, and all such modifications are deemed to be within the scope and spirit of the present invention defined by the appended claims.

What is claimed is:

1. A method of storing and retrieving one or more voxels of a beam disposed along one or more of a plurality of storage/retrieval directions of a 3-D matrix array in 3-D discrete voxel space, said 3-D discrete voxel space being specified in terms of x, y and z coordinate directions, said method comprising the steps of:

(a) storing said voxels into memory storage space, by mapping said voxels along one of said plurality of storage/retrieval directions, into a plurality of n independently accessible memory modules in said memory storage space, each said memory module being indexed with memory module indices $k=0, 1 \ldots n-1$ and each said k-th memory module having $n^2$ internal memory cell addresses, said n being an integer and each said memory cell provided with internal module indices, i and j, said mapping being carried out in accordance with a linear skewing function of the general form $k = (ax + by + cz) \bmod n$ where x, y and z are the coordinate values of each said voxel in said 3-D discrete voxel space, where $i=x$ and $j=y$, and where a, b and c are integer coefficients and n is a prime relative to said integer coefficients a, b and c, and linear combinations of said integer coefficients a, b and c the number of storage/retrieval directions in said $n^3$ matrix array in said 3-D discrete voxel space being based upon the values of said integers a, b, c and n; and (b) retrieving said voxels along one of said plurality of storage/retrieval directions in said 3-D voxel space, by demapping said one or more voxels along said beam by (i) determining each voxel depth measure representative of the depth of each said voxel in said $n^3$ matrix array in aid 3-D discrete voxel space, said determination of said voxel depth measure being determined based on one or more of said x, y and z coordinate values of said voxel, said integer coefficients a, b and c, and said module index k of said memory module into which said voxel has been mapped in step (a).

(ii) for each voxel along said beam parallel to said storage/retrieval direction, determining said memory cell indices i and j on the basis of said voxel depth measure and said x, y and z coordinate values corresponding to each said voxel, and (iii) identifying each voxel along a specified storage/retrieval direction using said memory cell indices i and j resulting from step b (ii) and said module index k resulting from step a.

2. The method according to claim 1, wherein each said integer coefficients a, b and c equals 1, so as to provide six storage/retrieval directions corresponding to the principal axes $\pm x$, $\pm y$, $\pm z$ of said $n^3$ matrix array.

3. The method according to claim 2, wherein step (a) (i) comprises determining for each said voxel, said voxel depth measures $d_{+x}$ and $d_{-x}$ for said voxels along said beams parallel to the x principal axis, said voxel depth measure $d_{+y}$ and $d_{-y}$ for said voxels along said beams parallel to the y principal axis, and said voxel depth measure $d_{+z}$ and $d_{-z}$ for said voxels along said beams parallel to said z principal axis, being determined, respectively, according to the functions $d_{+x} = (k - (y + z)) \bmod n$ $d_{-x} = n - d_{+x} - 1$ $d_{+y} = (k - (x+z)) \mod n$ $d_{-y} = n - d_{+y} - 1$ $d_{+z} = (k - (x+y)) \mod n$ $d_{-z} = n - d_{+z} - 1$ 4. The method according to claim 1, wherein said integer coefficient a equals 5, said integer coefficient b equals 2, and said integer coefficient c equals 1, so as to provide twenty-six storage/retrieval directions of said $n^3$ matrix array in said 3-D discrete voxel space.

5. A method of determining which voxel in a plurality of voxels along a beam parallel to a storage/retrieval direction of an $n^3$ matrix array in 3-D discrete voxel space, is closest to an observer viewing along said beam, said 3-D discrete voxel space being specified in terms of x, y and z coordinate directions, said method comprising the sequence of steps of:

(a) mapping said voxels along said beam parallel to said storage/retrieval direction into a plurality of n independently accessible memory modules being indexed with module indices $k = 0, 1, \ldots, n-1$, each said k-th memory module containing $n^2$ memory cells, each said memory cell being specified by internal module indices i and j, said mapping being carried out in accordance with a linear skewing function of the general form $k = (ax + by + cz) \mod n$ where x, y and z are the coordinate values of each said voxel in said 3-D discrete voxel space, where $i = x$ and $j = y$, and where a, b and c are integer coefficients, the number of storage/retrieval directions in said $n^3$ matrix array in said 3-D discrete voxel space being based upon the values of said integers a, b, c and n;

(b) for each said voxel in said string of voxels along said beam parallel to said storage/retrieval direction, determining a voxel depth measure representative of the depth of each said voxel in said $n^3$ matrix array in said 3-D discrete voxel space, said determination of said voxel depth measure being determined for each said voxel on the basis of one or more of said x, y and z coordinate values of said voxel, said integer coefficients a, b, and c, and said module index of said memory module into which said voxel has been mapped in step (a); and (c) comparing said voxel depth measures determined in step (b), so as to determine which voxel depth measure a predetermined extreme value, and thereby representative of the corresponding voxel being closest to said observer viewing along said beam parallel to said storage/retrieval direction.

6. The method of claim 5, wherein said voxel is further specified by a transparency parameter which is either a transparent or a non-transparent voxel value, and wherein said method further comprises prior to step (c), determining said voxels having a non-transparent voxel value, and wherein step (c) comprises comparing only said voxel depth ,measures determined in step (b) which correspond to said voxels determined above as having a non-transparent value, so as to determine which voxel having a non-transparent voxel value, has a predetermined extreme voxel depth measure value, and thereby representative of said voxel being closest to said observer viewing along said beam parallel to said storage/retrieval direction.

7. The method of claim 6, wherein said method comprises, prior to step (c), determining said non-transparent voxels along said beam, which have corresponding voxel depth measures within at least one predetermined depth measure range wherein step (c) comprises comparing only said voxel depth measures determined in step (b) which correspond to said non-transparent voxels determined above as having corresponding voxel depth measures within said predetermined depth measure range, so as to determine which voxel within said predetermined depth measure range, has a predetermined extreme voxel depth measure, and thereby representative of said voxel being closest to said observer viewing along said beam parallel to said storage/retrieval direction.

8. The method of claim 5 wherein each said voxel depth measure is represented by a plurality of binary digits, and wherein said comparison of voxel depth measures comprises (i) comparing the most significant binary digit of each said voxel depth measure, (ii) determining which voxels have the predetermined extreme voxel depth measure, on the basis of comparing said most significant binary digits, (iii) forming a group of voxels from the determination performed in step (ii), (iv) comparing the next consecutive most significant binary digits of voxel depth measures of said voxels in said voxel group formed in step (iii), (v) determining which voxels in said voxel group have the predetermined extreme voxel depth measure, on the basis of comparing said next consecutive largest significant binary digits, and (vi) repeatedly performing said comparing, determining and group formation steps on the basis of consecutive significant binary digits, until only one surviving voxel depth measure remains in said group, said surviving voxel depth measure corresponding to said voxel being the closest to said observer viewing along said storage/retrieval direction.

9. The method of claim 8, which further comprises, for a plurality of beams parallel to said storage/retrieval direction, each said beam having a plurality of voxels therealong, (1) mapping said plurality of voxels along each said beam, into said plurality of n independently accessible memory modules according to said linear skewing function, (2) determining a voxel depth measure for each said non-transparent voxel along each said beam, (3) for each said voxel along each said beam, comparing said voxel depth measures corresponding to said non-transparent voxels, so as to determine which voxel depth measure is a predetermined extreme value, and thereby representative of the corresponding non-transparent voxel being closest to said observer viewing along said beam parallel to said storage/retrieval direction, and (4) forming a two-dimensional image from said plurality of non-transparent voxel values determined in step (3) above.

10. A method of mapping the voxels of an $n^3$ matrix array in 3-D discrete voxel space, into a plurality of n independently accessible memory modules, said 3-D discrete voxel space being specified in terms of x, y and z coordinate directions, said method comprising:

(a) defining a plurality of 3-D voxel subspaces sequentially numbered module n, for K=0, 1, ... n−1, and grouping together each said K-th 3-D voxel subspace, each said K-th 3-D voxel subspace containing a set of voxels having x, y and z coordinate values;

(b) providing a plurality of independently accessible nxn memory modules indexed K=0, 1, ... n−1, each said K-th memory module containing n² memory cells, each memory cell being specified by internal module indices, i, j;

(c) assigning each grouping of said K-th 3-D voxel subspaces to said K-th memory module; and (d) for each said voxel having said x, y and z coordinates, mapping from said 3-D voxel space, into said K-th memory module according to $$K=(5x+2y+z) \bmod n$$

and into the (i, j)-th memory cell according to x=i and y=j.

11. Apparatus for simultaneously storing and retrieving a beam of voxels disposed parallel to a storage/retrieval direction of an n³ matrix array in 3-D discrete voxel space, said 3-D discrete voxel space being specified in terms of x, y and z coordinate directions, said apparatus comprising:

storing means for storing said voxels into memory storage space, by mapping said voxels along one of said plurality of storage/retrieval directions, into a plurality of n independently accessible memory modules in said memory storage space, each said memory module being indexed by a memory module index and having internal memory cell addresses, said n being an integer, said mapping being carried out in accordance with a skewing function expressed in terms of said x, y and z coordinate directions and said integer n; and retrieving means for retrieving said voxels along one of said plurality of storage/retrieval directions in said 3-D voxel space, by demapping said one or more voxels from said memory storage space into said 3-D voxel space using spatial parameters and said integer n, said retrieving means comprising:

(i) a plurality of n modules being indexed with module indices K=0, 1, ... n−1, each said k-th module including a k-th memory module, a k-th local address unit for independently accessing said k-th memory module, each said memory cell of each said k-th memory module being specified by internal module indices i and j, each said k-th local address unit including a local voxel depth computation unit for computing a voxel depth measure of each voxel residing in said k-th memory module, said voxel depth measure of each voxel being representative of the depth of said voxel in said n³ matrix array, and being determined on the basis of one or more of said x, y and z coordinate values of said voxel, said integer coefficients a, b and c, and said module index k of said memory module into which said voxel is mapped, said local addressing unit further including means for determining for each said voxel, said memory cell indices i and j on the basis of said voxel depth measure and said x, y and z coordinate values corresponding to each said voxel, and memory cell index selection means for selecting memory cell indices i and j from global memory cell indices i″ and j″ and said voxel depth measures along said storage/retrieval directions, (ii) a central control unit including a central addressing unit for generating module indices k″=0, 1, ... n−1, and global memory cell indices i″ and j″, said central addressing unit further including means for carrying out the mapping of said voxels along said beams parallel to said storage/retrieval direction, into said plurality of n independently accessible memory modules, said mapping being carried out in accordance with a linear skewing function of the general form $$k=(ax+by+cz) \bmod n$$

where x, y and z are the coordinate values of each said voxel in said 3-D discrete voxel space, where i=x and j=y, and where a, b and c are integer coefficients and n is a prime relative to said integer coefficients a, b and c, or to linear combinations of said integer coefficients a, b, and c of the number of storage/retrieval directions in said n³ matrix array being based upon the values of said integers a, b, c and n, (iii) means for transferring global memory cell indices i″ and j″ from said central addressing unit to said plurality of n local address units, and (iv) means for transferring said beam of voxels, into or from said n memory modules.

12. The apparatus of claim 11, wherein each said k-th module further comprises a voxel multiple write processing unit for processing voxels accessed from said k-th memory module, a k-th voxel value storage register for storing the k-th voxel value of the k-th voxel along said beam parallel to said storage/retrieval direction, a k-th voxel depth measure register for storing said voxel depth measure of said k-th voxel along said beam parallel to said storage/retrieval direction, a k-th voxel depth competition unit for locally comparing the value of said voxel depth measure of said k-th voxel with all other voxels of said beam parallel to said storage/retrieval direction, and determining which said voxel depth measure has a predetermined extreme value and generating a voxel pass control signal corresponding to said voxel depth measure having said predetermined extreme value, and writing means for writing into a two-dimensional frame buffer, said voxel value stored in said k-th voxel value storage register corresponding to said voxel pass control signal.

13. Apparatus of claim 12, which further includes means for providing transparency control parameters to said voxel multiple write processing units, each said k-th voxel multiple write processing unit further including a k-th voxel transparency control unit for receiving said transparency control parameters and for controlling the local comparison of said voxel depth measures within said k-th voxel depth competition unit, said voxel depth competition control being carried out on the basis of said voxel value in said k-th voxel value register and said transparency control parameters.

14. Apparatus of claim 12, wherein each said voxel depth measure is represented by a plurality of binary bits, and wherein said local voxel depth competition unit comprises means for
  (i) comparing the most significant binary bits of each said voxel depth measure,
  (ii) determining which voxels have a predetermined extreme voxel depth measure, on the basis of comparing said most significant binary bits,
  (iii) forming a group of voxels from the determination performed in step (ii),
  (iv) comparing the next consecutive most significant binary bits of voxel depth measures of said voxels in said voxel group formed in step (iii),
  (v) determining which voxels in said voxel group have the predetermined extreme voxel depth measure, on the basis of comparing said next consecutive most significant binary bits.

15. The apparatus of claim 12, which further includes intermodule voxel value moving means for moving voxel values stored in said k-th voxel value storage registers, to other voxel value storage registers.

16. The apparatus of claim 11, wherein each said k-th local address unit includes a local comparison means for comparing the voxel depth measure of each said voxel with at least one preselected voxel depth measure range, and controlling the local comparison of said voxel depth measures within said k-th voxel depth competition unit, said voxel depth competition control being carried out on the basis of said voxel being within said preselected voxel depth measure range.

17. A 3-D voxel-based graphics system comprising:
  a memory and addressing system for storing and retrieving 3-D voxel based images along a plurality of storage/retrieval directions in 3-D discrete voxel space, said memory and addressing system including a plurality of modules each said module having a memory module, and a local address unit, for independently addressing said memory module;
  a central addressing unit for simultaneously transmitting to each said module, broadcasted addresses and control parameters;
  means for transferring said broadcasted addresses and control parameters to each said module; and
  means for transferring said voxel-based images into or from said n memory modules.

18. The 3-D voxel-based graphics system of claim 17, wherein said system further comprises
  at least one voxel-based processor for accessing said n memory modules.

19. The 3-D voxel-based graphics system of claim 18 wherein said voxel-based processor is selected from the group consisting of a 3-D geometry processor, a 3-D frame buffer processor, and 3-D viewing processor.

* * * * *